US012681163B2

(12) United States Patent (10) Patent No.: US 12,681,163 B2

Jeon et al. (45) Date of Patent: Jul. 14, 2026

(54) SIGN APPARATUS FOR VEHICLE

(71) Applicant: SAMSUNG ELECTRONICS CO., LTD., Suwon-si (KR)

(72) Inventors: Jinyong Jeon, Suwon-si (KR); Seung Tae Khang, Suwon-si (KR); Sungdo Choi, Suwon-si (KR); Jong-Sok Kim, Suwon-si (KR); Young Rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 18/326,173

(22) Filed: May 31, 2023

(65) Prior Publication Data

US 2024/0142605 A1 May 2, 2024

(30) Foreign Application Priority Data

Oct. 26, 2022 (KR) ........................ 10-2022-0139519

(51) Int. Cl.
  *G01S 13/75* (2006.01)
  *G01S 13/931* (2020.01)
(52) U.S. Cl.
  CPC .......... *G01S 13/751* (2013.01); *G01S 13/931* (2013.01); *G01S 2013/9329* (2020.01)
(58) Field of Classification Search
  CPC ................. G01S 13/751; G01S 13/931; G01S 2013/9329
  See application file for complete search history.

(56) References Cited

U.S. PATENT DOCUMENTS

| | | | |
|---|---|---|---|
| 10,223,600 B2 * | 3/2019 | Fischer ............... | G06V 10/811 |
| 2009/0321529 A1 * | 12/2009 | Jesme ............. | G06K 19/07749 |
| | | | 29/829 |
| 2012/0008129 A1 | 1/2012 | Lu et al. | |
| 2016/0119509 A1 | 4/2016 | Wato | |
| 2019/0061760 A1 | 2/2019 | Pawlicki et al. | |
| 2019/0204120 A1 * | 7/2019 | Wang ................. | G06K 19/0672 |
| 2020/0326460 A1 * | 10/2020 | Kim .......................... | E01F 9/30 |
| 2021/0231772 A1 * | 7/2021 | Convent .............. | G01S 13/931 |

FOREIGN PATENT DOCUMENTS

| | | |
|---|---|---|
| JP | 2008-286566 A | 11/2008 |
| JP | 2009-063544 A | 3/2009 |
| JP | 2010-286246 A | 12/2010 |
| KR | 10-2006-0099874 A | 9/2006 |
| KR | 10-2010-0016059 A | 2/2010 |

* cited by examiner

*Primary Examiner* — Nazra Nur Waheed

(74) *Attorney, Agent, or Firm* — NSIP Law

(57) ABSTRACT

Disclosed is a sign apparatus for displaying a sign for traffic or a vehicle, where the sign apparatus includes a display configured to display the sign and to permit a radar signal radiated from a source to pass, a filter configured to attenuate a signal of at least one frequency in the radar signal passing through the display and to allow a signal of a remaining frequency to pass, and a reflector configured to reflect the signal passing through the filter, wherein the reflected signal includes encoded identification information of the sign.

20 Claims, 16 Drawing Sheets

Filter 900

Unit cell

1300

1313

1312

1311

SIGN APPARATUS FOR VEHICLE

CROSS-REFERENCE TO RELATED APPLICATIONS

This application claims the benefit under 35 USC § 119(a) of Korean Patent Application No. 10-2022-0139519, filed on Oct. 26, 2022, in the Korean Intellectual Property Office, the entire disclosure of which is incorporated herein by reference for all purposes.

BACKGROUND

1. Field

The following disclosure relates to a sign apparatus for a vehicle.

2. Description of Related Art

Advanced driver-assistance systems (ADAS) improve drivers' safety and convenience and avoid dangerous situations by using sensors mounted inside or outside a vehicle.

The sensors used for ADAS may include a camera, an infrared sensor, an ultrasonic sensor, a light detection and ranging (lidar) sensor, and a radio detection and ranging (radar) sensor. Among those sensors, the radar sensor may stably measure objects in the vicinity of a vehicle without being affected by the surrounding environment, such as weather, when compared to optical sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for displaying a sign including a display configured to display the sign and to permit a radar signal radiated from a source to pass, a filter configured to attenuate a signal of at least one frequency in the radar signal passing through the display and to allow a signal of a remaining frequency to pass, and a reflector configured to reflect the signal passing through the filter, wherein the reflected signal includes encoded identification information of the sign.

The identification information may have N digits, a first digit to a last digit of the N digits may correspond to different frequencies, and the filter may be configured to attenuate a signal of a frequency corresponding to a digit having a first value and to allow a signal of a frequency corresponding to a digit having a second value to pass.

The filter may be configured to attenuate a signal of a frequency corresponding to the first digit in response to the first digit having the first value, and to allow the signal of the frequency corresponding to the first digit in response to the first digit having the second value.

The filter may include unit cells, and each of the unit cells may include a resonator having a frequency corresponding to a digit having the first value as a resonance frequency.

The filter may include unit cells, and each of the unit cells may include a number of resonators corresponding to a number of first values in the identification information or equal to a multiple of the number of first values.

Each of the unit cells may include resonators of different sizes, in response to the identification information having a plurality of first values.

The resonators may be positioned on different layers.

A spacing between the unit cells corresponds to half a wavelength value of a center frequency of the radiated radar signal.

The filter may be spaced apart from the reflector by a first distance.

The first distance may be greater than a result of multiplying a wavelength value of a center frequency of the radiated radar signal with a value.

The reflector may include a trihedral corner reflector.

The source may include a radar sensor disposed in an autonomous vehicle.

In another general aspect, there is provided an apparatus for displaying a sign, the apparatus including a display configured to display the sign and to permit a radar signal radiated from a source to pass, a filter comprising resonators, the filter configured to attenuate a signal of a resonant frequency of each of the resonators in the radar signal passing through the display and to allow a signal of a remaining frequency to pass, and a reflector configured to reflect the signal passing through the filter, wherein the reflected signal includes encoded identification information of the sign.

The identification information may have N digits, a first digit to a last digit of the N digits may correspond to different frequencies, and the resonant frequency may be same as a frequency of a digit having a first value in the identification information.

The filter may include unit cells, and each of the unit cells may include one or more resonators of the resonators.

A spacing between the unit cells may correspond to half a wavelength value of a center frequency of the radiated radar signal.

The filter may be spaced apart from the reflector by a first distance value.

The first distance value may be greater than a result of multiplying a wavelength value of a center frequency of the radiated radar signal with a value.

The reflecting board may include a trihedral corner reflector.

The source may include a radar sensor disposed in an autonomous vehicle.

Other features and aspects will be apparent from the following detailed description, the drawings, and the claims.

Figure 1:
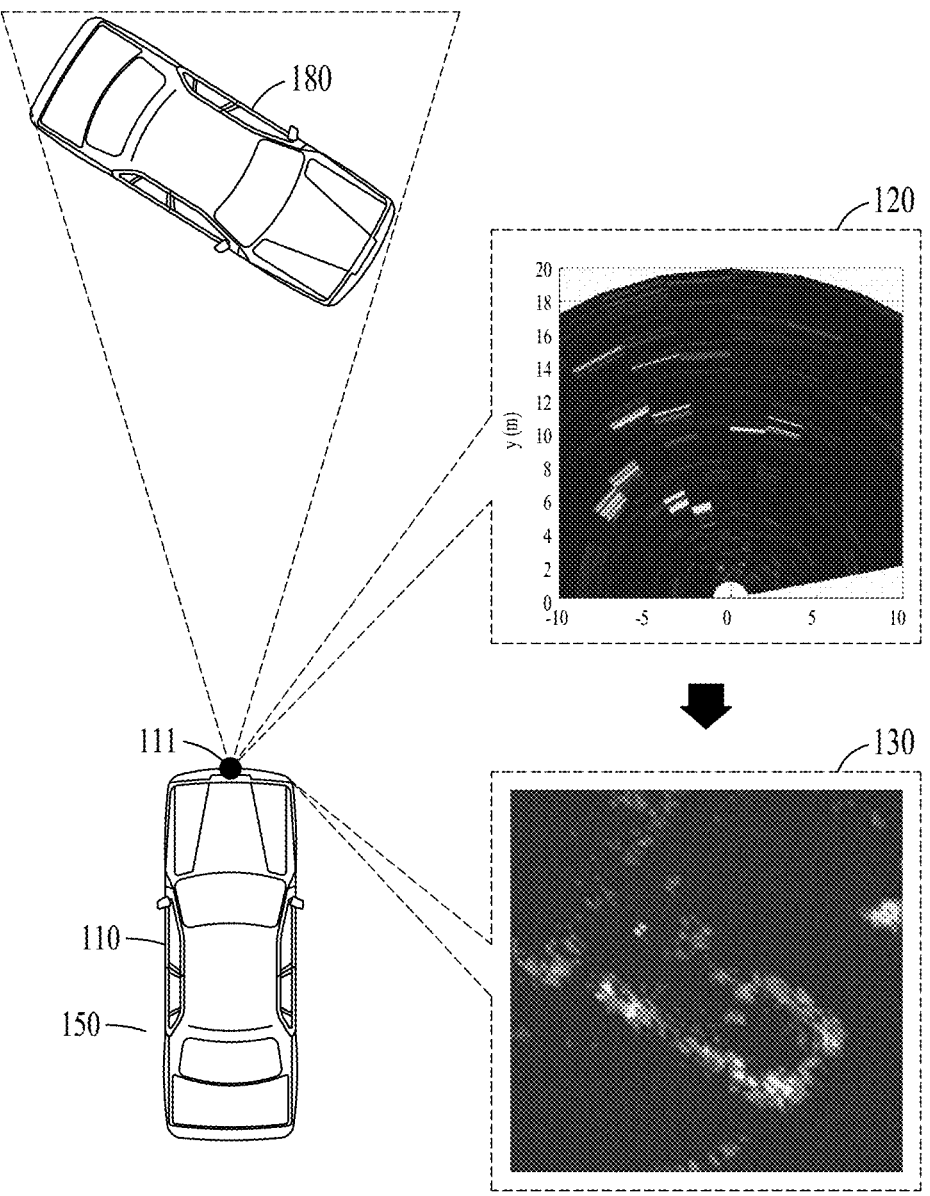
FIG. 1 illustrates an example of recognizing a surrounding environment through a radar signal processing method.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of recognizing a surrounding environment through a radar signal processing method.

Referring to FIG. 1, a radar signal processing apparatus 110 may be disposed in a vehicle 150. In some examples, the radar signal processing apparatus 110 detects information on a target 180 ahead of the vehicle 150 (e.g., range, velocity, direction, and the like) by analyzing a radar signal received from a radar sensor 111. In some examples, the radar sensor 111 may be positioned inside or outside the radar signal processing apparatus 110, and the radar signal processing apparatus 110 may detect the information on the target 180 based on both the radar signal received from the radar sensor 111 and data collected by another sensor (e.g., an image sensor, etc.). Resolving power in radar data processing may be divided into resolving power performance in terms of hardware and resolving power performance in terms of software. Hereinafter, improvement of the resolving power performance in terms of software comprising instructions that when operated on the hardware configure the hardware to perform various operations will be mainly described.

In an example, the resolving power refers to the power of a device to discriminate a very small change, for example, smallest unit discriminative power, and it may be expressed as "resolving power=(discriminable smallest scale unit)/(total operation range)". The smaller the resolving power value of the device, the more precise results the device may output. The resolving power value may also be referred to as the resolving power unit. For example, if the device has a small resolving power value, the device may discriminate a relatively small unit and thus, the device may output results with increased resolution and improved precision. If the device has a great resolving power value, the device may not discriminate a small unit and thus, output results with reduced resolution and reduced precision.

The radar signal processing apparatus 110 may be mounted on the vehicle 150 as shown in FIG. 1. The vehicle may perform various automated driving activities, such as, for example, adaptive cruise control (ACC), automatic emergency braking (AEB), blind spot detection (BSD), lane change assistance (LCA), and other similar operations based on the range to the target 180 detected by the radar signal processing apparatus 110. Furthermore, the radar signal processing apparatus 110 may generate a surrounding map 130 in addition to detecting the range. The surrounding map 130 is a map representing the positions of various targets existing around the radar signal processing apparatus 110, such as the target 180. The targets may include moving objects such as vehicles and people, and static objects such as guardrails, traffic signs, signs, and traffic lights present in the background.

The surrounding map 130 may be generated using single scan imaging. In single scan imaging, the radar signal processing apparatus 110 acquires a single scan image 120 from the sensor and generates the surrounding map 130 from the acquired single scan image 120. The single scan image 120 is generated from the radar signal sensed by a single radar sensor 111, and may represent the ranges indicated by radar signals received at a predetermined elevation angle with a relatively high resolving power. For example, in the single scan image 120 shown in FIG. 1, the horizontal axis denotes the steering angle of the radar sensor 111, and the vertical axis denotes the range from the radar sensor 111 to the target 180. However, the form of a single scan image is not limited to that shown in FIG. 1. The single scan image may be represented in a different format without deviating from the script and scope of the illustrative examples.

The steering angle may be an angle corresponding to a target direction from the radar signal processing apparatus 110 toward the target 180. For example, the steering angle may be an angle between the target direction and the traveling direction of the radar signal processing apparatus 110 (or the vehicle 150 including the radar signal processing apparatus 110). In an example, the steering angle is described mainly based on an angle through a horizontal plane, but is not limited thereto. For example, the steering angle may also be applied to an elevation angle.

The radar signal processing apparatus 110 may obtain information on the shape of the target 180 through a multi-radar map. The multi-radar map may be generated from a combination of radar scan images. For example, the radar signal processing apparatus 110 may generate the surrounding map 130 by spatiotemporally combining the radar scan images acquired as the radar sensor 111 moves. The surrounding map 130 may be a type of radar image map and in an example be used for pilot parking.

The radar signal processing apparatus 110 may use direction of arrival (DOA) information to generate the surrounding map 130. The DOA information refers to information indicating the direction in which a radar signal reflected from a target is received. The radar signal processing apparatus 110 may identify the direction in which the target exists relative to the radar sensor 111 using the DOA information described above. Therefore, such DOA information may be used to generate radar scan data and surrounding maps.

Radar information, such as range, velocity, DOA, and map information, about the target 180 generated by the radar signal processing apparatus 110 may be used to control the vehicle 150 equipped with the radar signal processing apparatus 110. For example, controlling the vehicle 150 may include controlling the speed and steering of the vehicle 150, such as ACC, AEB, BSD, and LCA. A control system of the vehicle 150 may control the vehicle 150 directly or indirectly based on the radar information. For example, when a Doppler velocity of a target is measured, the control system may accelerate the vehicle 150 to follow the target or may brake the vehicle 150 to prevent a collision with the target.

Figure 2:
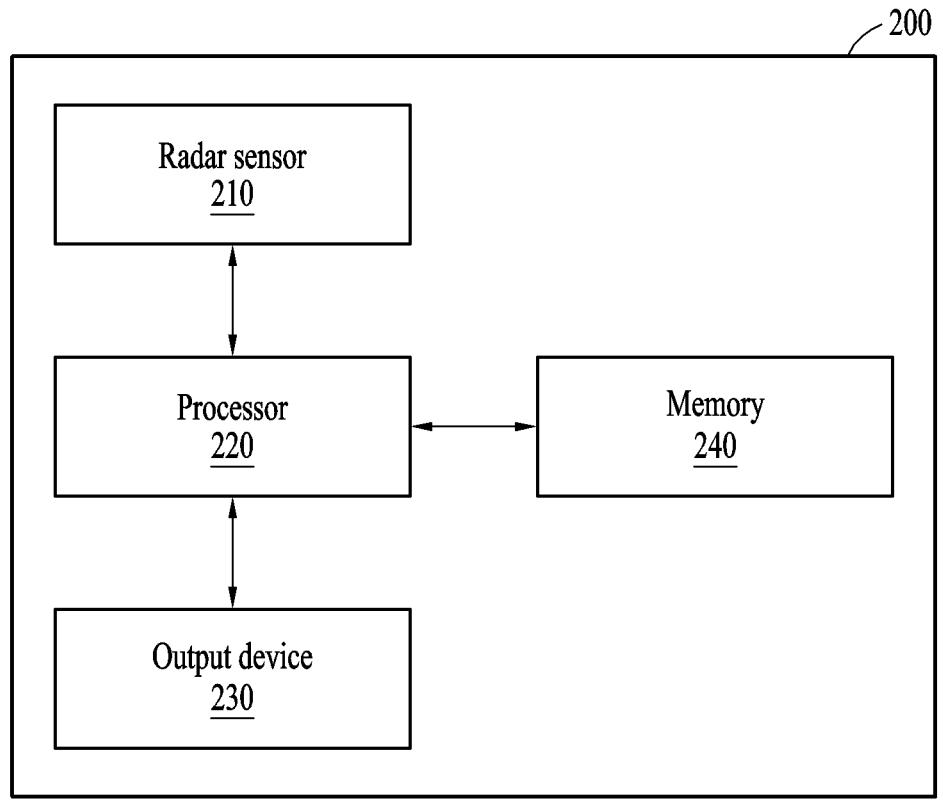
FIG. 2 illustrates an example of a radar signal processing apparatus.

FIG. 2 illustrates an example of a radar signal processing apparatus.

Referring to FIG. 2, a radar signal processing apparatus 200 (e.g., the radar signal processing apparatus 110 of FIG. 1) may include a radar sensor 210 (e.g., the radar sensor 111 of FIG. 1), a processor 220, an output device 230, and a memory 240. The radar sensor 210 may radiate a radar signal to the outside of the radar sensor 210 and receive a signal (hereinafter, referred to as the "reflected signal") as the radiated radar signal is reflected by a target.

The radar signal may include a chirp signal with a carrier frequency modulated based on a frequency modulation model. The frequency of the radar signal may change within a band. For example, the frequency of the radar signal may linearly change within the band.

The radar sensor 210 may include an array antenna and be configured to transmit a radar signal and to receive a reflected signal through the array antenna. The array antenna may include a plurality of antenna elements. Multiple input multiple output (MIMO) may be implemented through the plurality of antenna elements. In this case, a plurality of MIMO channels may be formed by the plurality of antenna elements. For example, a plurality of channels corresponding to M×N virtual antennas may be formed through M transmission antenna elements and N reception antenna elements. Here, reflected signals received through the channels may have different phases according to reception directions.

Radar data may be generated based on the radar signal and the reflected signal. For example, the radar sensor 210 may transmit the radar signal through the array antenna based on the frequency modulation model, receive the reflected signal through the array antenna when the radar signal is reflected by the target, and generate an intermediate frequency (IF) signal based on the radar signal and the reflected signal. The IF signal may have a frequency corresponding to a difference between the frequency of the radar signal and the frequency of the reflected signal. The processor 220 may perform a sampling operation on the IF signal, and generate raw radar data through sampling results. However, the operation of the processor 220 is not limited thereto, and the processor 220 may perform at least one of the operations described with reference to FIGS. 3 to 16 in parallel or in a time series.

The processor 220 may control at least one other component of the radar signal processing apparatus 200 and perform processing of various pieces of data or computations. The processor 220 may control an overall operation of the radar signal processing apparatus 200 and may execute corresponding processor-readable instructions for performing operations of the radar signal processing apparatus 200. The processor 220 may execute, for example, software stored in the memory 240 to control one or more hardware components, such as, sensor 210 of the radar signal processing apparatus 200 connected to the processor 220 and may perform various data processing or operations, and control of such components.

The processor 220 may be a hardware-implemented data processing device. The hardware-implemented data processing device 220 may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 220 are provided below.

The processor 220 may generate and use information on the target based on the raw radar data. For example, the processor 220 may perform range fast Fourier transform (FFT), Doppler FFT, constant false alarm rate (CFAR) detection, DOA estimation, and the like based on the raw radar data, and obtain the information on the target, such as range, velocity, and direction. Such information on the target may be provided for various applications such as AAC, AEB, BSD, and LCA.

The memory 240 may store radar information, such as the radar signal and the reflected signal, the surrounding map 130, the single scan image 120, and/or other information related to determine the sign. However, this is only an example, and the information stored in the memory 240 is not limited thereto. In an example, the memory 240 may store a program (or an application, or software). The stored program may be a set of syntaxes that are coded and executable by the processor 220 to operate the radar signal processing apparatus 200. The memory 240 may include a volatile memory or a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 240 are provided below.

In some examples, the processor 220 may output the surrounding map 130 and/or the single scan image 120 through the output device 230. In some examples, the output device 230 may provide an output to a user through auditory, visual, or tactile channel. The output device 230 may include, for example, a speaker, a display, a touchscreen, a vibration generator, and other devices that may provide the user with the output. The output device 230 is not limited to the example described above, and any other output device, such as, for example, computer speaker and eye glass display (EGD) that are operatively connected to the electronic device 740 may be used without departing from the spirit and scope of the illustrative examples described. In an example, the output device 230 is a physical structure that includes one or more hardware components that provide the ability to render a user interface, output information and speech, and/or receive user input.

In some examples, the radar signal processing apparatus 200 may be installed in or wirelessly connected to a vehicle. Hereinafter, a vehicle refers to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a walking assist device (WAD), a robot, a drone, and a flying object such as an airplane. In some examples, the vehicle may be, for example, an autonomous vehicle, a smart mobility, an electric vehicle, an intelligent vehicle, an electric vehicle (EV), a plug-in hybrid EV (PHEV), a hybrid EV (HEV), or a hybrid vehicle, an intelligent vehicle equipped with an advanced driver assistance system (ADAS) and/or an autonomous driving (AD) system.

In some examples, the autonomous vehicle is a self-driving vehicle that is equipped with one or more sensors, cameras, radio detection and ranging (RADAR), light detection and ranging (LiDAR) sensor, an infrared sensor, and an ultrasonic sensor, and/or other data-capturing devices that collect information about the surrounding environment. The autonomous vehicle may be controlled by an onboard computer system that uses algorithms, machine learning, and other artificial intelligence techniques to interpret the sensor data and to make decisions based on that information. The computer system can control the vehicle's speed, direction, acceleration, and braking, as well as other systems such as lighting, heating, and air conditioning. In some examples, the autonomous vehicle may be equipped with communication technologies to interact with other vehicles, infrastructure, and/or a central control system(s). The autonomous vehicle may operate in various modes, such as, for example, fully autonomous, semi-autonomous, and remote control where it is controlled by the central control system(s).

In some examples, the radar signal processing apparatus 200 may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IoT) devices that are controlled through a network, and other consumer electronics/information technology (CE/IT) devices.

Figure 3:
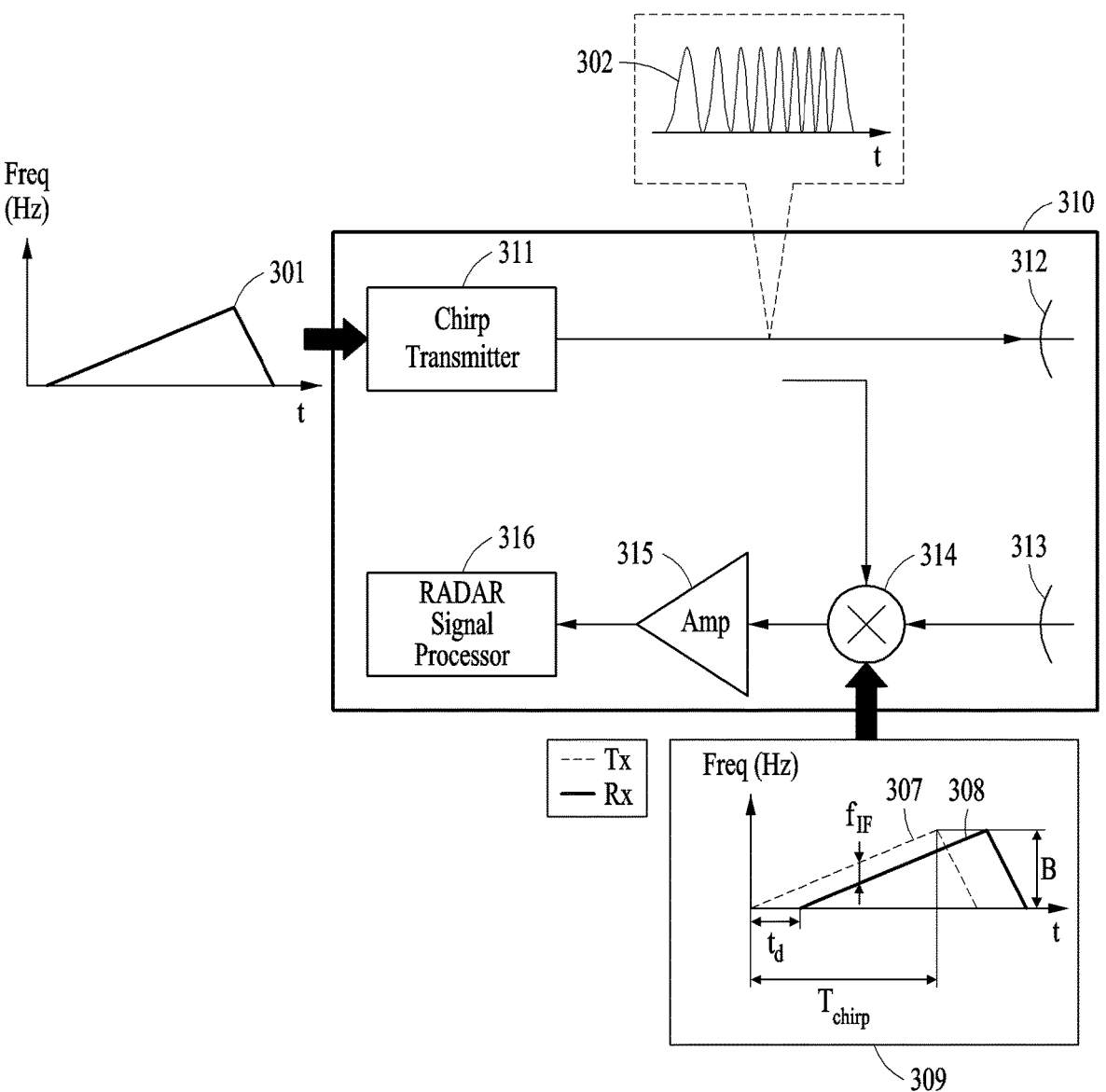
FIG. 3 illustrates an example of a radar sensor.

FIG. 3 illustrates an example of a radar sensor.

Referring to FIG. 3, a radar sensor 310 (e.g., the radar sensor 111, 210) may include a chirp transmitter 311, antennas 312 and 313, a frequency mixer 314, an amplifier 315, and a radar signal processor 316.

The radar signal processor 316 may correspond to the processor 220 of FIG. 2. In some examples, the radar signal processor 316 may be disposed outside the radar sensor 310, like the processor 220. The radar sensor 310 may radiate a signal (e.g., a radar signal) through the transmission antenna 312 and may receive a signal (e.g., a reflected signal) through the reception antenna 313.

Although FIG. 3 shows a single transmission antenna 312 and a single reception antenna 313 as an example, the radar sensor 310 may include a plurality of transmission antennas and a plurality of reception antennas.

The radar sensor 310 may be, for example, a millimeter-wave (mmWave) radar and may be configured to measure the range to a target by analyzing a time of flight (ToF) and changes in the waveform of the radar signal, wherein the ToF is the time it takes for a radiated electromagnetic wave to return after being reflected by the target. In some examples, the mmWave radar may detect an object regardless of external environment changes such as fog, rain, and the like, compared to optical sensors including cameras. In some examples, the mmWave radar has better cost performance than Li DAR and may be used to compensate for the disadvantages of optical sensors described above.

In some examples, the radar sensor 310 may be implemented as a frequency modulated continuous wave (FMCW) radar. The FMCW radar may be robust against external noise.

The chirp transmitter 311 may generate a frequency modulated (FM) signal (or FWCW signal) 302 with a frequency that changes with time. For example, the chirp transmitter 311 may generate the FM signal 302 by performing frequency modulation according to the frequency modulation characteristics of a frequency modulation model 301. The FM signal 302 may also be referred to as a chirp signal. Herein, the frequency modulation model 301 may be a model configured to represent changes in a carrier frequency of a radar signal during a transmission time. The vertical axis of the frequency modulation model 301 may denote the carrier frequency, and the horizontal axis may denote time. For example, the frequency modulation model 301 may have a frequency modulation characteristic of linearly changing (e.g., linearly increasing or linearly decreasing) the carrier frequency. As another example, the frequency modulation model 301 may have a frequency modulation characteristic of non-linearly changing the carrier frequency.

FIG. 3 shows the frequency modulation model 301 having a frequency modulation characteristic where the frequency linearly increases over a time period, and after the time period the frequency linearly decreases over another time period. In the example illustrated in FIG. 3, the rate of linear increase of the frequency and the rate of linear decrease of the frequency are different from each other. The chirp transmitter 311 may generate the FM signal 302 having a carrier frequency according to the frequency modulation model 301. For example, as shown in FIG. 3, the FM signal 302 may exhibit a waveform in which the carrier frequency gradually increases in some intervals, and exhibit a waveform in which the carrier frequency gradually decreases in the remaining intervals.

A portion of the FM signal 302 may be coupled and transmitted to the frequency mixer 314, and the remaining portion of the FM signal 302 may be radiated as a radar signal through the transmission antenna 312. In some examples, the radar sensor 310 may include a duplexer. In this example, radiating a radar signal and receiving a reflected signal may be performed by the same antenna (hereinafter, referred to as the "antenna A"), unlike the example shown in FIG. 3. The chirp transmitter 311 may transmit the FM signal 302 to the duplexer. The duplexer may determine a transmission path and a reception path for signals through the antenna A. For example, the duplexer may form a signal path from the chirp transmitter 311 to the antenna A, transmit the FM signal 302 to the antenna A through the signal path, and then radiate the FM signal 302 to the outside. While the radar sensor 310 receives the signal reflected from the target, the duplexer may form a signal path from antenna A to the radar signal processor 316.

The frequency mixer 314 may compare a frequency 308 of the reflected signal and a frequency 307 of the radar signal. For reference, the frequency 307 of the radar signal may change as the carrier frequency indicated by the frequency modulation model 301 changes. The frequency mixer 314 may detect an intermediate frequency (IF) corresponding to a frequency difference between the frequency 308 of the reflected signal and the frequency 307 of the radar signal. In a graph 309 shown in FIG. 3, the frequency difference between the radar signal and the reflected signal is constant during an interval in which the carrier frequency linearly increases along the time axis in the frequency modulation model 301, and is proportional to the range between the radar sensor 310 and the target. Accordingly, the range between the radar sensor 310 and the target may be derived from the frequency difference between the radar signal and the reflected signal. A beat frequency signal detected through the frequency mixer 314 may be transmitted to the radar signal processor 316 via the amplifier 315. The beat frequency signal may be expressed by Equation 1 below.

$$y(T) = \frac{\alpha}{2}\cos\left(\varphi_0 - 2\pi f_c t_d + \pi \frac{B}{T_c}t_d^2 - 2\pi\frac{B}{T_c}t_d t\right) \qquad \text{Equation 1}$$

In Equation 1, $\alpha$ denotes a path loss attenuation, $\varphi_0$ denotes a phase offset (or a direct current constant value), $f_c$ denotes a carrier frequency, $t_d$ denotes a round-trip delay, B denotes a sweep bandwidth of a transmitted chirp, and $T_c$ denotes a chirp duration. $T_c$ may be the same value as $T_{chirp}$ in the graph 309.

A plurality of radar sensors may be installed in various parts of a vehicle, and the radar signal processing apparatus 110, 200 may calculate a range to a target, a direction, and a relative velocity in all directions of the vehicle based on information sensed by the plurality of radar sensors. The radar signal processing apparatus 110, 200 may be mounted on the vehicle, and may provide various functions, such as, for example, ACC, AEB, BSD, LCA, etc., which are useful for driving.

Each of the plurality of radar sensors may radiate a radar signal including a chirp signal with a frequency modulated based on a frequency modulation model to the outside and receive a signal reflected from the target. The radar signal processing apparatus 110, 200 may determine a range from each of the plurality of radar sensors to a target from a frequency difference between the radiated radar signal and the received reflected signal. In addition, when the radar sensor 310 has a plurality of channels, the radar signal processing apparatus 110, 200 may derive a DOA of the signal reflected from the target based on phase information in the raw radar data.

In some examples, the radar sensor 310 may use a wide bandwidth and MIMO to meet the demands for a wide field of view (FoV) and a high resolution (HR) for various applications. The range resolution may increase through the wide bandwidth, and the angular resolution may increase through MIMO. The range resolution may represent the smallest unit to discriminate distance information on the target, and the angle resolution may represent the smallest unit to discriminate DOA information on the target. For example, the radar sensor 310 may use broadband such as 4 GHz, 5 GHz, or 7 GHz instead of a narrow band such as 200 MHz, 500 MHz, or 1 GHz.

The radar sensor 310 may identify a transmission signal of each transmission antenna according to MIMO through time-division multiplexing (TDM). According to TDM, transmission antennas may alternately transmit transmission signals. Thus, the length of time of a rising interval of a carrier frequency of each transmission signal (that is, a chirp repetition period) may increase. This may cause a reduction in an unambiguously measurable Doppler velocity and/or in the range of the Doppler frequency. The radar signal processor 316 may perform signal processing that is robust against a Doppler ambiguity by compensating a coupling component between the Doppler frequency and the DOA and/or the Doppler velocity due to the movement of a target in a radar system based on TDM MIMO.

Figure 4:
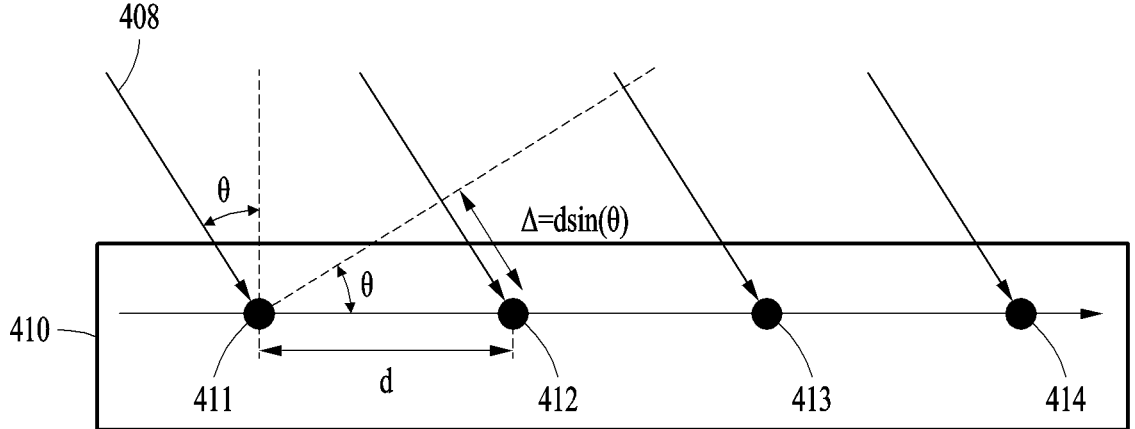
FIG. 4 illustrates an example of reception antennas of a radar sensor.

FIG. 4 illustrates an example of reception antennas of a radar sensor.

Equation 2 below may be derived by more specifically analyzing the round-trip delay component of the beat frequency signal of Equation 1.

$$t_d = \frac{2R}{c} = \frac{2\left(R^0 + R^\theta\right)}{c} = \frac{2R^0 + d\sin\theta}{c} = t_{d,0} + t_{d,\theta} \qquad \text{Equation 2}$$

11

In Equation 2, R denotes the range between an antenna element and a target, R ° denotes the range between the radar sensor 310 and the target, R ° denotes the range difference based on an interval between antenna elements of the radar sensor 310, c denotes the speed of light, and d denotes the distance between the antenna elements. According to Equation 2, the round-trip delay element may be decomposed into a range component $t_{d,0}$ and a DOA component $t_{d,\theta}$. Equation 1 may be expressed as in Equation 3 below based on the range component $t_{d,0}$ and the DOA component $t_{d,\theta}$ of the round-trip delay component.

$$y(t) = \frac{\alpha}{2}(\Phi_0 + \Phi_t(t_{d,0}) + \Phi_t(t_{d,\theta})) \qquad \text{Equation 3}$$

$$\Phi_0 = -2\pi f_c t_{d,0} + \pi \frac{B}{T_c} t_{d,0}^2 - 2\pi f_c t_{d,\theta} + 2\pi \frac{B}{T_c} t_{d,0} t_{d,\theta} + \pi \frac{B}{T_c} t_{d,\theta}^2$$

$$\Phi_t(t_{d,0}) = -2\pi \frac{B}{T_c} t_{d,0} t$$

$$\Phi_t(t_{d,\theta}) = -2\pi \frac{B}{T_c} t_{d,\theta} t$$

The range to the target may be derived by detecting a component $\phi_t(t_{d,0})$ through a frequency analysis (e.g., a Fourier transform) of the beat frequency signal for each antenna element. The DOA may be estimated by detecting a third term $2\pi f_c t_{d,\theta}$ of the component $\phi_0$ from a phase change between the antenna elements.

When the radar sensor 310 has a plurality of reception channels, phase information in radar data (e.g., raw radar data) may indicate a phase difference between a phase of a signal received through each reception channel and a reference phase. The reference phase may be a predetermined phase, or may be set to a phase of one of the plurality of reception channels. For example, the radar signal processing apparatus 200 may set, for a reception antenna element, a phase of a reception antenna element adjacent to the reception antenna element as the reference phase.

In addition, the radar signal processor 316 may generate a radar vector of a dimension corresponding to the number of reception channels of the radar sensor 310 from the radar data. For example, if a radar sensor has four reception channels, the radar signal processing apparatus may generate a four-dimensional (4D) radar vector including phase values corresponding to the reception channels. The phase values corresponding to the reception channels may be numerical values representing the phase difference described above.

For example, it may be assumed that the radar sensor 310 has one transmission (TX) channel and four reception (RX) channels. In this case, a radar signal radiated through the TX channel may be reflected by a target and then received through the four RX channels. As shown in FIG. 4, if a reception array antenna 410 of the radar sensor includes a first reception antenna element 411, a second reception antenna element 412, a third reception antenna element 413, and a fourth reception antenna element 414, a phase of a signal received at the first reception antenna element 411 may be set as a reference phase. When a reflected signal 408 reflected from the same target is received at the reception array antenna 410, an additional distance A between the range from the target to the first reception antenna element 411 and the range from the target to the second reception antenna element 412 may be expressed as in Equation 4 below.

$$\Delta = d \cdot \sin(\theta) \qquad \text{Equation 4}$$

12

In Equation 4, a denotes a DOA in which the reflected signal 408 is received from the target, d denotes the distance between the reception antenna elements, and c denotes the speed of light.

Figure 5:
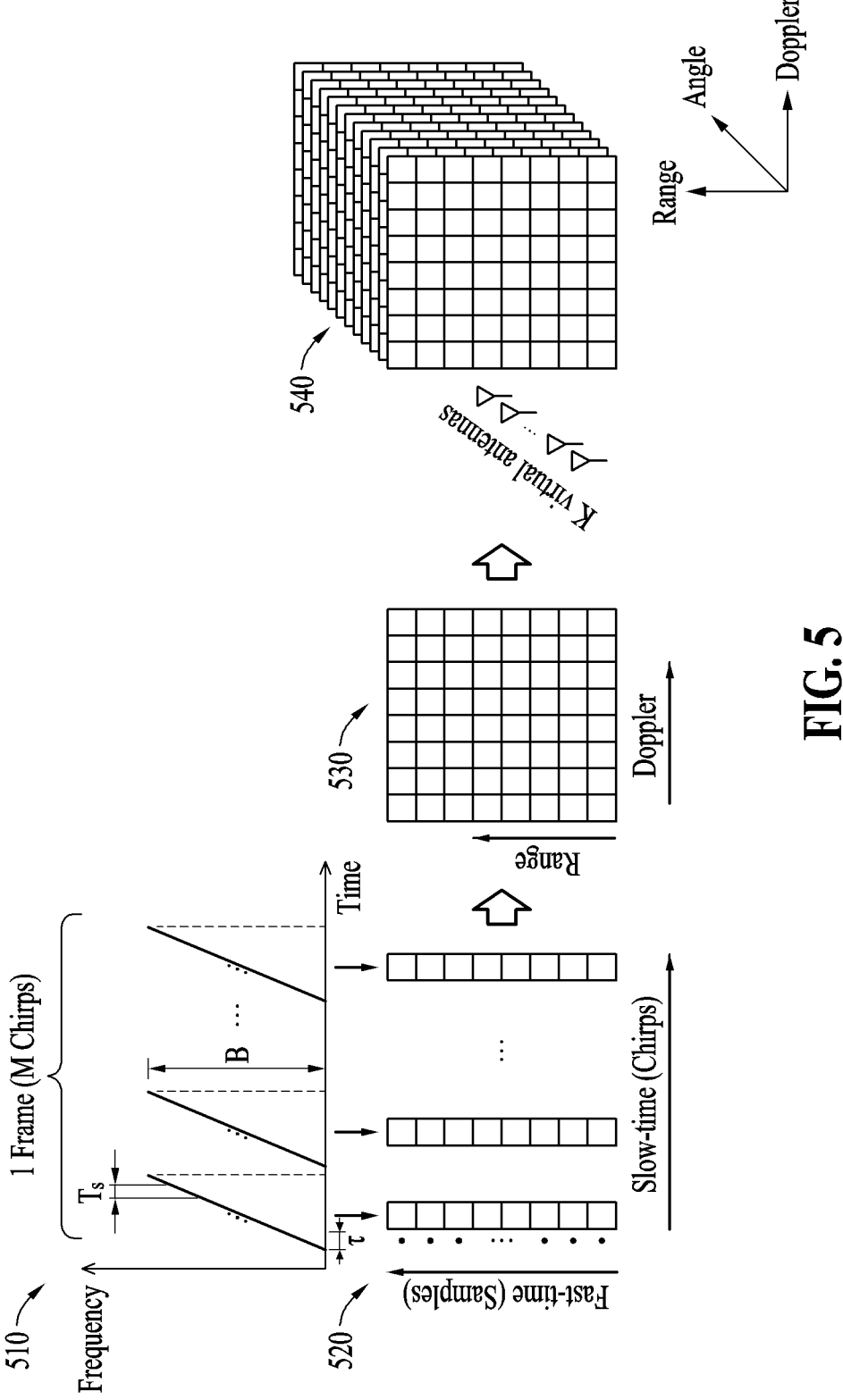
FIG. 5 illustrates an example of an operation of processing chirp sequences.

FIG. 5 illustrates an example of an operation of processing chirp sequences.

A radar signal of one frame may include a plurality of chirp signals. For example, one frame may include a plurality of time slots, and the radar sensor 310 may transmit one chirp signal through one transmission antenna during each time slot. A time slot may be a unit time interval in which one chirp signal is transmitted. One frame may correspond to one scan. For example, one frame may include L chirp sequences, and each chirp sequence may include a plurality of time slots (e.g., M time slots). Each of the plurality of chirp sequences included in the same frame may include time slots in number equal to the number of transmission antennas included in the radar sensor 310. A radar signal of one frame may include L×M chirp signals. The radar sensor 310 may radiate L×M chirp signals during a frame corresponding to one scan, and sense reflected signals when the L×M chirp signals are reflected. Here, L and M may each be an integer greater than or equal to "1". The radar sensor 310 may include M transmission elements, and each chirp sequence may include M time slots corresponding to the number of transmission antenna elements. In FIG. 5, a frequency change tendency of a radar signal 510 shown for a frame of L=1 may include frequency change tendencies over time for the respective L×M chirp signals.

The above-described radar signal of one frame may be interpreted based on a fast-time axis and a slow-time axis. The slow-time axis may be a time axis separated by chirp signals, and the fast-time axis may be a time axis in which frequency changes of individual chirp signals are observable. For example, the radar signal processing apparatus 200 may transmit the radar signal 510 (e.g., L×M chirp signals) in one frame, and receive a reflected signal (e.g., L×M reflected signals) of the radar signal 510. The radar signal processing apparatus 200 may obtain L×M bit signals from the transmitted chirp signals and the reflected signals. In the fast-time axis, a bit frequency signal corresponding to each chirp signal may be sampled at a plurality of sampling points. A beat frequency signal may be a signal having a frequency difference between a transmitted signal (e.g., a chirp signal) and a reflected signal of the transmitted signal. For example, an individual chirp signal may be radiated, arrive at a target, and be reflected from the target, and the reflected signal may be received by the radar sensor 310. The radar signal processing apparatus 200 may sample the value of the beat frequency signal between the radiated chirp signal and the reflected signal. The radar signal processing apparatus 200 may sample a beat frequency signal corresponding to each chirp signal included in the radar signal 510 at every sampling interval Ts. In other words, the radar signal processing apparatus 200 may obtain S sample values 520 from a beat frequency signal corresponding to one chirp signal. Here, S may be an integer greater than or equal to "1". Assuming that the sample values 520 are sample values at one virtual antenna, the sample values 520 may be converted into data 530 with a Doppler axis and a range axis.

The radar signal 510 may include L chirp sequences per frame, and K virtual antennas may individually receive the radar signal. Accordingly, the radar signal processing apparatus 200 may obtain S×L×K sample values. When the number of transmission antennas is M and the number of reception antennas is N, the number of virtual antennas may be K=M×N. Here, N may be an integer greater than or equal to "1". Raw radar data 540 may be a data cube configured in S×L×K dimensions based on a Doppler axis, a range axis, and an angle axis, respectively. However, the raw radar data 540 is not limited to the data cube of FIG. 5, and may vary depending on a design. The raw radar data 540 may be converted into radar data in a form including a range profile, an angle profile, and a range-Doppler map by frequency conversion described below.

When a target is moving, a beat frequency may include a range component based on the range to the target and a Doppler frequency component due to a movement of the target.

$$f_B = f_R - f_D = \frac{B}{T_{chirp}}\frac{2R^0}{c} + \frac{2v}{\lambda} \qquad \text{Equation 5}$$

In Equation 5, $f_R$ denotes a range component, $f_D$ denotes a Doppler frequency component, A denotes a wavelength, B denotes a sweep bandwidth of a transmitted chirp, $T_{chirp}$ denotes a chirp duration, and v denotes the velocity of a target.

The radar signal processing apparatus 200 may generate a range-Doppler map by performing frequency conversion on the raw radar data 540. For example, the frequency conversion may include two-dimensional (2D) Fourier transform including first Fourier transform based on a range and second Fourier transform based on a Doppler frequency. Here, the first Fourier transform may be a range FFT, the second Fourier transform may be a Doppler FFT, and the 2D Fourier transform may be a 2D FFT. In some examples, the radar signal processing apparatus 200 may obtain a range profile by performing, on the raw radar data 540, only the first Fourier transform based on a range. The range profile may indicate an intensity of a received signal for each range.

The radar signal processing apparatus 200 may detect one or more target cells from the range-Doppler map. For example, the radar signal processing apparatus may detect one or more target cells through constant false alarm rate detection (CFAR) on the range-Doppler map. CFAR detection may be a thresholding-based detection technique.

The radar signal processing apparatus 200 may determine an ambiguous Doppler velocity of a first target based on first frequency information of a first target cell. For example, the first target cell may be a cell corresponding to a peak intensity in a Doppler spectrum of the raw radar data 540. The first frequency information may include a Doppler frequency at which the peak intensity appears. The radar signal processing apparatus 200 may determine a Doppler velocity corresponding to the Doppler frequency to be the first ambiguous Doppler velocity. A relationship between an unambiguous Doppler velocity and the ambiguous Doppler velocity may be expressed as in Equation 6 below.

$$v_{D,unamb} = v_{D,amb} + q \cdot (2v_{D,max}) \qquad \text{Equation 6}$$

In Equation 6, $v_{D,unamb}$ denotes the unambiguous Doppler velocity, $v_{D,amb}$ denotes the ambiguous Doppler velocity, q denotes the ambiguity number, $v_{D,max}$ denotes the maximum range of the Doppler velocity that is unambiguously measurable through a chirp sequence signal, and q may have an integer value.

The radar signal processing apparatus 200 may radiate a plurality of linear chirp signals (e.g., chirp signals whose frequencies linearly increase) within one frame. For example, the radar signal processing apparatus may radiate tens to hundreds of chirp signals within one frame. The radar signal processing apparatus 200 may estimate a velocity based on phase differences due to a Doppler phenomenon between the radiated chirp signals and corresponding reflected signals. In some examples, the radar signal processing apparatus may estimate an angle (e.g., an angle of arrival) of a target based on a radar sensor, using a multiple-input multiple-output (MIMO) antenna structure.

The radar signal processing apparatus 200 may transmit the plurality of chirp signals using a plurality of transmission antennas. The radar signal processing apparatus 200 may identify transmission antennas having radiated transmitted signals (e.g., chirp signals) corresponding to reflected signals received at a plurality of reception antennas based on time-division multiplexing (TDM). TDM may be a technique for activating a transmission antenna with a physical time difference between operations of radiating chirp signals. Here, when a radar signal to be transmitted in one frame includes a total of L×M chirp signals, a radar signal transmitted by each transmission antenna may be modeled as in Equation 7 below.

$$s(t) = \begin{cases} \cos\left\{2\pi\left(f_c t + \frac{1}{2}\frac{B}{T_c}t^2\right)\right\}, & \text{where } 0 \le t' < T_c \\ 0, & \text{where } T_c \le t' < T_p \end{cases} \qquad \text{Equation 7}$$

$$t = t' + (l \cdot M + m) \cdot T_p, \qquad \text{Equation 8}$$

$$\text{where } l \in \{0, \ldots, L-1\}, m \in \{0, \ldots, M-1\}$$

In Equations 7 and 8 above, $f_c$ denotes a carrier frequency, B denotes a sweep bandwidth of a transmitted chirp signal, $T_c$ denotes the length of an interval in which the frequency changes (e.g., linearly increases), and $T_p$ denotes a time interval (e.g., a chirp radiation period) from a time point at which radiation of one chirp signal is initiated to a time point at which radiation of a subsequent chirp signal is initiated, and may correspond to a time length of a time slot. T denotes a time point within a frame, and t' denotes a time point within an individual time slot. The radar signal processing apparatus 200 may transmit L×M chirp signals by dividing them through M transmission antennas. The radar signal processing apparatus 200 may receive a reflected signal from the receiving antenna after hitting the target. The time (e.g., the round-trip time) Ti it takes for a radar signal to return from an i-th target to a reception antenna after being radiated may be expressed as in Equation 9 below according to the range to the i-th target, the velocity of the i-th target, and the angle of the i-th target.

$$\tau_i(t', l \cdot M + m, n) = \frac{\begin{array}{l} 2[r_i + v_i(l \cdot M + m)T_p] + \\ [(l \cdot M + m) \bmod M]d_{TX}\sin\theta_i + \\ n \cdot d_{RX}\sin\theta_i \end{array}}{c} \qquad \text{Equation 9}$$

In Equation 9 above, l·M+m denotes a chirp index, n denotes an index of a reception antenna, $r_i$ denotes the range to the i-th target, $v_i$ denotes the velocity of the i-th target, $\theta_i$ denotes the angle of the i-th target, $D_{TX}$ denotes the distance between transmission antennas, and d Rx denotes the distance between reception antennas. Assuming a uniform linear array design, $d_{RX}$ may be λ/2, and $d_{TX}$ may be M×$d_{RX}$.

Figure 6A:
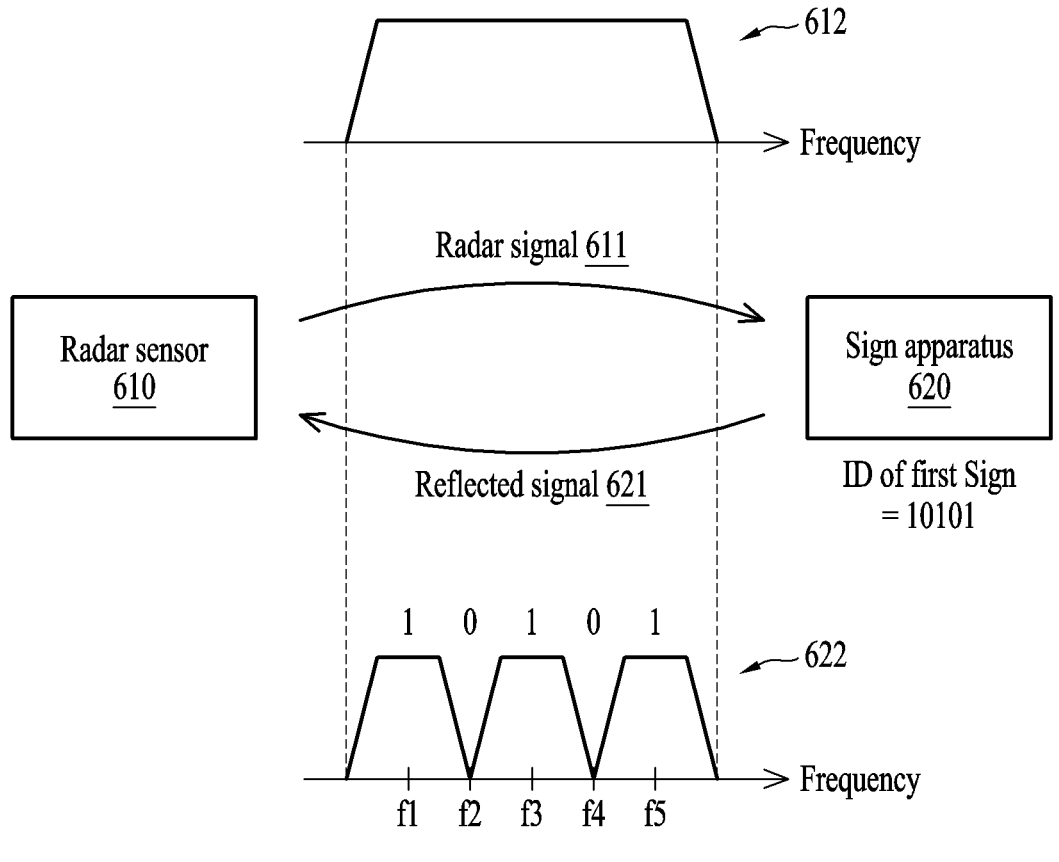
FIGS. 6A and 6B illustrate an example of recognizing a sign apparatus by a radar signal processing apparatus.
Figure 6B:
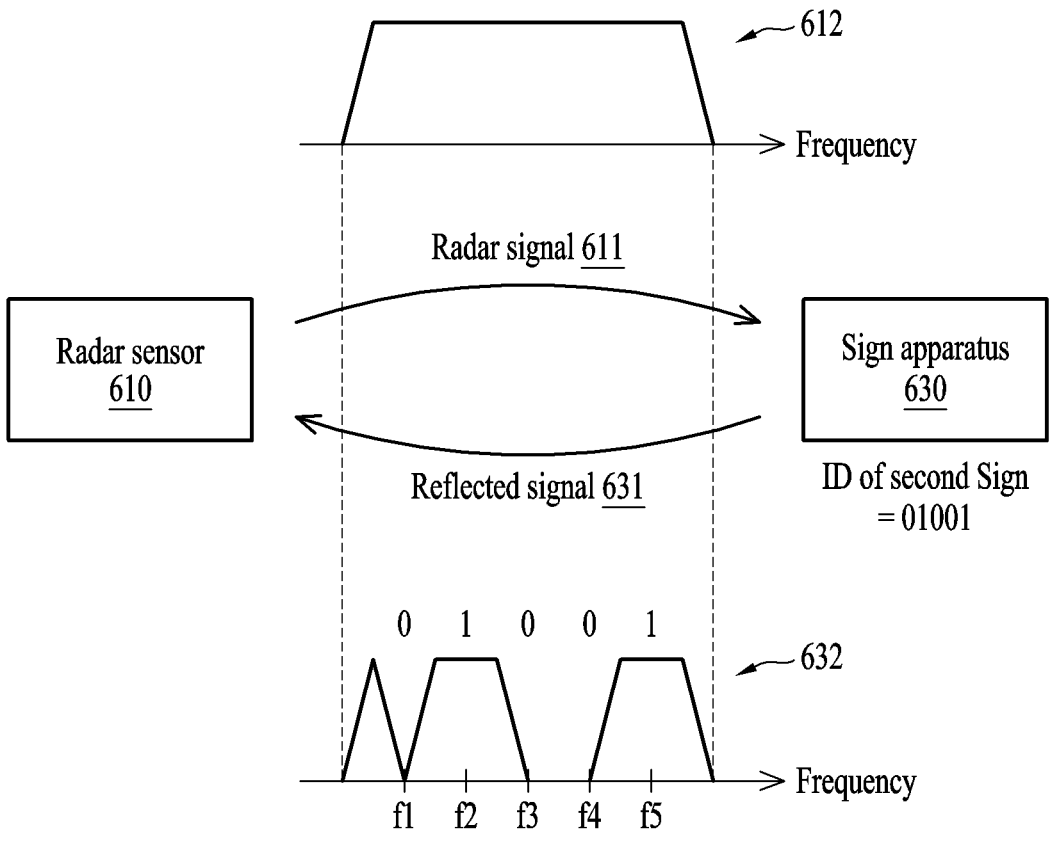

FIGS. 6A and 6B illustrate an example of recognizing a sign apparatus by a radar signal processing apparatus.

Referring to FIG. 6A, a radar sensor 610 (e.g., the radar sensor 310) may radiate a radar signal 611 (e.g., the FM signal 302). A graph 612 shows an example of a spectrum of the radar signal 611.

The radar signal 611 may be incident to a sign apparatus 620.

The sign apparatus 620 may display a sign for a road or traffic. In some embodiments, the sign apparatus 630 may change which sign it is displaying (i.e., the sign apparatus 630 may have a display, an array of lamps functioning as a display, a physical means of changing the displayed sign, etc.) In the example of FIG. 6A, the sign displayed by the sign apparatus 620 will be referred to as the "first sign". The first sign may include, for example, a no right turn sign, a no U-turn sign, a speed limit sign, a one way sign, and the like. The first sign is not limited to the examples listed above. In some examples, the sign apparatus 620 may read the name of signs identifying entities and location. In some examples, the sign apparatus 620 may guide an autonomous or semi-autonomous vehicle to various facilities in a hospital, such as emergency, radiology, surgery etc. In some examples, an autonomous or semi-autonomous vehicle may read the sign apparatus 620 to convey travelers to different gates at an airport, railway station, or bus terminus. In some examples, the sign apparatus 620 may guide an autonomous or semi-autonomous vehicle to various departments in a college or university. In such a scenario, the autonomous or semi-autonomous vehicle may read the sign apparatus 620 to determine the name of a department of the college or the university, such as History Department, Computer Sciences Department, Civil Engineering Department etc.

According to an example, the first sign may have identification information (ID). For example, as in the example shown in FIG. 6A, the first sign may have 5-digit identification information "10101", which may be big-endian or little-endian. In some examples, the most significant bit of the identification information of the first sign may represent a first digit of the identification information of the first sign, and the least significant bit of the identification information of the first sign may represent a last digit (e.g., a fifth digit) of the identification information of the first sign. Examples are not limited thereto. In some examples, the most significant bit of the identification information of the first sign may represent the last digit of the identification information of the first sign, and the least significant bit of the identification information of the first sign may represent the first digit of the identification information of the first sign.

The sign apparatus 620 may filter the incident radar signal 611 through a filter. The filter may have resonators of different frequencies (within the frequency range of the radar signal 611), and each resonator/frequency may correspond to a different digit of any identification information. For example, the digits of any identification information may respectively correspond to frequencies f1 to f5, and the resonators may resonate at those frequencies, respectively. Which of the resonators are active (or not) at any time may depend on which sign the sign apparatus 620 is current displaying and the identification information that corresponds to the current sign.

As noted, the digits of the identification information of the first sign may correspond to respective frequencies f1 to f5 (shown in FIGS. 6A and 6B), for example. The filter of the sign apparatus 620 may include a resonator having, as a resonant frequency, a frequency corresponding to a digit having a first value (e.g., "0") of the identification information of the first sign. In some examples, a resonator having, as a resonant frequency, a frequency corresponding to a digit having a first value (e.g., "0") may mean that the corresponding resonator is active, i.e., the resonators of the "0" digits of the sign info of the first sign are activated. The active resonators may negate the signal of the corresponding frequency. In some examples, a resonator having, as a resonant frequency, a frequency corresponding to a digit having a second value (e.g., "1") may mean that the corresponding resonator is inactive, i.e., the resonators of the "1" digits of the sign info of the first sign are inactivated. The inactive resonators may permit the signal of the corresponding frequency to pass.

The second digit and the fourth digit of the first sign may have the first value. The filter of the sign apparatus 620 may include a resonator having, as the resonant frequency, the frequency f2 corresponding to the second digit of the identification information of the first sign and a resonator having, as the resonant frequency, the frequency f4 corresponding to the fourth digit of the identification information of the first sign. The filter may negate or attenuate a signal portion having the frequency f2 and a signal portion having the frequency f4 in the radar signal 611 through the resonators (for example, by the action of destructive interference). Such negating/filtering may cause the radar signal passing through the filter to be encoded with the identification information (e.g., 10101) of the first sign.

The sign apparatus 620 may reflect the filtered radar signal through a reflecting board or the reflector.

A reflected signal 621 may pass through the filter and be transmitted to the radar sensor 610, and the reflected signal 621 may include the encoded identification information of the first sign (i.e., the identification information/number is encoded in the reflected signal 621 by its energy spectrum). In the example shown in FIG. 6A, an energy spectrum of the reflected signal 621 may not include (or may have minimal/reduced or another characteristic) energy at the frequencies f2 and f4, but may include energy at the frequencies f1, f3, and f5. A graph 622 shows an example of an energy spectrum of the reflected radar signal 621 encoding the identification information of the first sign.

The radar signal processing apparatus 200 may process (e.g., decode) the reflected signal 621 to recognize the first sign of the sign apparatus 620 based on the energy spectrum of the reflected signal 621. A vehicle may then be controlled to drive according to the first sign recognized by the radar signal processing apparatus 200.

Referring to FIG. 6B, the radar sensor 610 may radiate a radar signal 611.

The radar signal 611 may be incident to a sign apparatus 630.

In the example of FIG. 6B, the sign displayed by the sign apparatus 630 will be referred to as the "second sign". The second sign may be different from the first sign. The second sign may be any of, for example, a no right turn sign, a no U-turn sign, a speed limit sign, a one way sign, and the like. The second sign is not limited to the examples listed above.

According to an example, the second sign may have identification information. For example, as in the example shown in FIG. 6B, the second sign may have 5-digit identification information "01001". In some examples, the most significant bit of the identification information of the second sign may represent a first digit of the identification information of the second first sign, and the least significant bit of the identification information of the second sign may represent a last digit of the identification information of the second sign. Examples are not limited thereto. In another example, the most significant bit of the identification information of the second sign may represent the last digit of the identification information of the second sign, and the least significant bit of the identification information of the second sign may represent the first digit of the identification information of the second sign.

The sign apparatus 630 may filter the incident radar signal 611 through the filter of the sign apparatus 630.

The digits of the identification information of the second sign may correspond to frequencies f1 to f5 of FIG. 6B, for example. The filter of the sign apparatus 630 may include a resonator having, as a resonant frequency, a frequency corresponding to a digit having a first value (e.g., "0") of the identification information of the second sign. The first digit, the third digit, and the fourth digit of the second sign may have the first value. The filter of the sign apparatus 630 may include a resonator having, as the resonant frequency, the frequency f1 corresponding to the first digit of the identification information of the second sign, a resonator having, as the resonant frequency, the frequency f3 corresponding to the third digit of the identification information of the second sign, and a resonator having, as the resonant frequency, the frequency f4 corresponding to the fourth digit of the identification information of the second sign. The filter may negate (or attenuate) energy of a signal portion having the frequency f1, a signal portion having the frequency f3, and a signal portion having the frequency f4 in the radar signal 611 through the resonators. Such selective negating/attenuating (or filtering) may cause the radar signal passing through the filter to include the encoded identification information (e.g., 01001) of the second sign.

The sign apparatus 630 may reflect the filtered radar signal through a reflecting board.

A reflected signal 631 may pass through (or interact with) the filter and be transmitted to the radar sensor 610, and the reflected signal 631 may include the encoded identification information of the second sign. In the example shown in FIG. 6B, the energy spectrum of the reflected signal 631 may include no (or low) energy at the frequencies f1, f3, and f4, but may include full/ordinary energy at the frequencies f2 and f5. A graph 632 shows an example of the energy spectrum of the radar signal 631 for the example of FIG. 2B.

The radar signal processing apparatus 200 may process the reflected signal 631 to recognize the second sign of the sign apparatus 630. A vehicle may be controlled to drive according to the second sign recognized by the radar signal processing apparatus 200.

Figure 7:
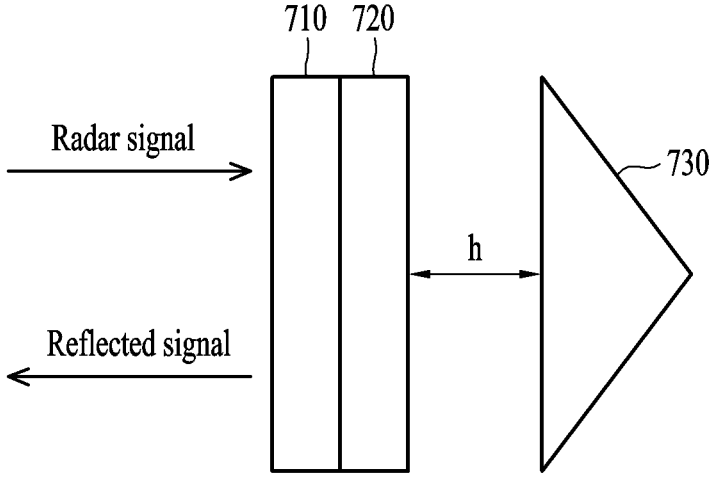
FIG. 7 illustrates an example of a sign apparatus.

FIG. 7 illustrates an example of a sign apparatus.

Referring to FIG. 7, a sign apparatus 700 (e.g., the sign apparatus 620 of FIG. 6A or the sign apparatus 630 of FIG. 6B) may include a display 710, a filter 720, and a reflecting board or a reflector 730.

The display 710 may display a sign for traffic or a road. For example, signs expressed through at least one of a number, a character, or a symbol (e.g., a stop sign. a no right turn sign, a no U-turn sign, a speed limit sign, a one way sign, etc.) may be printed on a transparent film (e.g., ElectroCut (EC) film). The display 710 may include a transparent film on which signs are printed. The display 710 is not limited to the transparent film.

The display 710 may allow a radar signal radiated from a source (e.g., the radar sensor 610) to pass.

Identification information of a sign of the sign apparatus 700 may have N digits. A first digit to a last digit of the N digits may correspond to different frequencies, respectively, in a frequency band of the radar signal. For example, when identification information of a sign has 5 digits, a first digit of the identification information of the sign may correspond to a frequency f1, a second digit of the identification information of the sign may correspond to a frequency f2, a third digit of the identification information of the sign may correspond to a frequency f3, a fourth digit of the identification information of the sign may correspond to a frequency f4, and a fifth digit of the identification information of the sign may correspond to a frequency f5, as described with reference to FIGS. 6A and 6B.

The filter 720 may reject or attenuate a signal of at least one frequency in the radar signal passing through the display 710 and allow a signal of a remaining frequency to pass. For example, the filter 720 may include a plurality of resonators. The filter 720 may include a resonator having, as a resonant frequency, a frequency corresponding to a digit having a first value (e.g., "0") of the identification information of the sign. The filter 720 may reject or attenuate a signal of a resonant frequency of each of the resonators in the radar signal passing through the display 710 and allow a signal of a remaining frequency to pass.

In some examples, the filter 720 may filter a signal (e.g., a radar signal) in a mmWave band and may thus be called a mmWave filter.

The reflecting board 730 may reflect the signal passing through the filter 720.

The filter 720 and the reflecting board 730 may be spaced apart by a first distance value h. The first distance value h may be greater than a result of multiplying a wavelength value λ of a center frequency of the radiated radar signal with a predetermined value (e.g., "10"). For example, the first distance value h may be greater than 10λ.

The signal reflected by the reflecting board 730 (i.e., the reflected signal) (e.g., the reflected signal 621 of FIG. 6A or the reflected signal 631 of FIG. 6B) may pass through the filter 720 and the display 710 and be transmitted to the source. As described with reference to FIGS. 6A and 6B, the reflected signal may include the encoded identification information of the sign of the sign apparatus 700.

Figure 8:
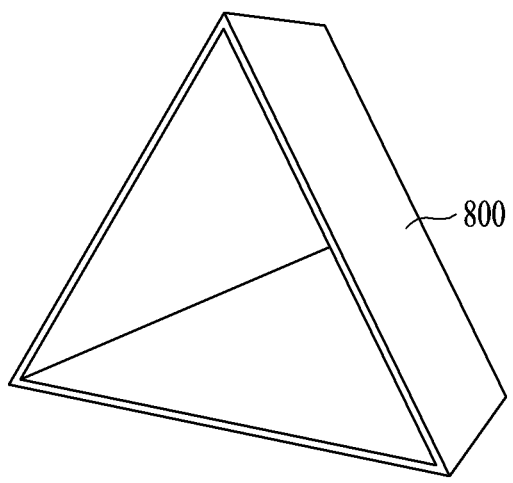
FIG. 8 illustrates an example of a reflecting board or a reflector of a sign apparatus.

FIG. 8 illustrates an example of a reflecting board of a sign apparatus.

Referring to FIG. 8, a reflecting board 800 is shown. The reflecting board 800 may correspond to an example of the reflecting board 730.

The reflecting board 800 of FIG. 8 may have a trihedral shape. For example, the reflecting board 800 may be a trihedral corner reflector.

In one example, the sign apparatus 700 may include a reflective sheet instead of the reflecting board 700.

Figure 9:
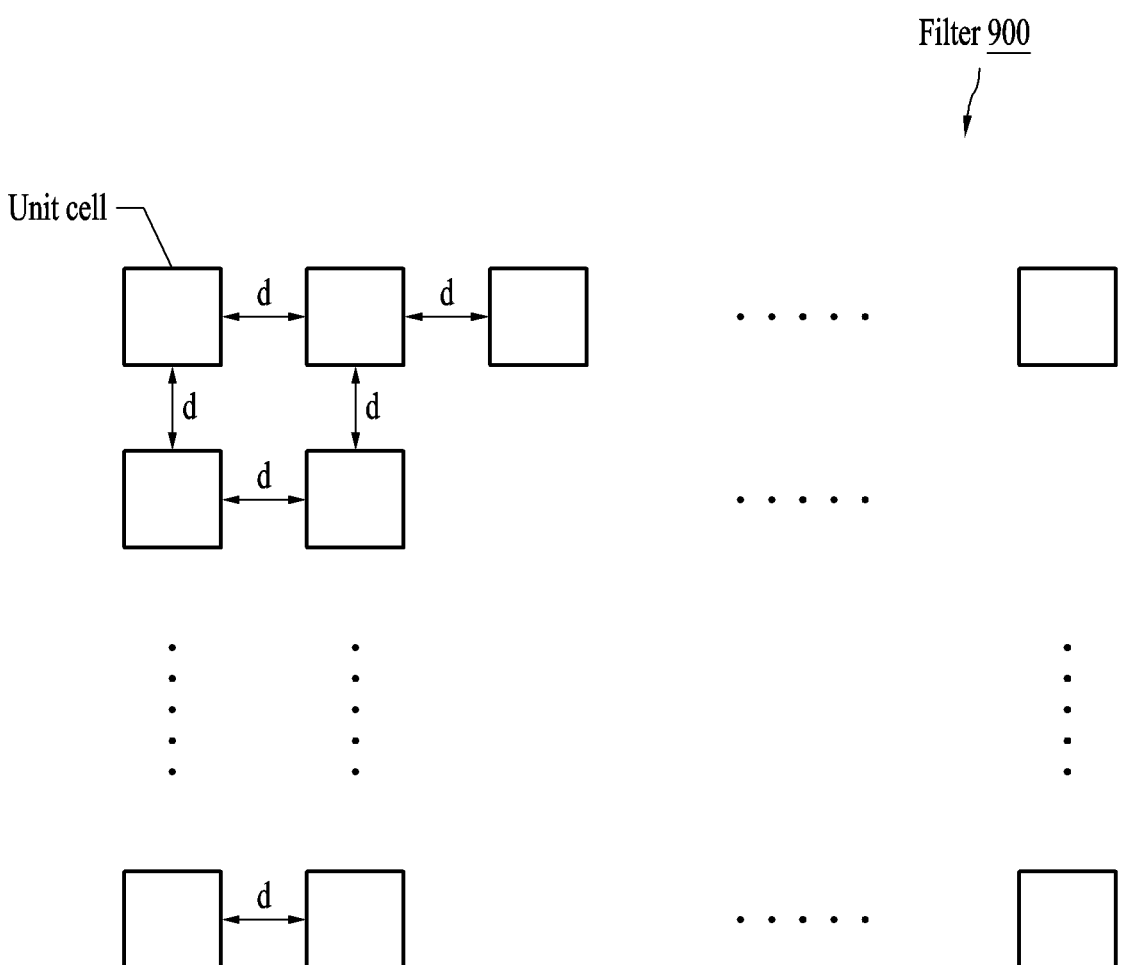
FIG. 9 illustrates an example of a filter of a sign apparatus.

FIG. 9 illustrates an example of a filter of a sign apparatus.

Referring to FIG. 9, a filter 900 is shown. The filter 900 may correspond to an example of the filter 720.

The filter 900 may include a plurality of unit cells. A spacing d between the unit cells may correspond to half a wavelength value λ of a center frequency of the radiated radar signal. For example, the spacing d may be approximately equal to λ/2.

Each of the unit cells may include one or more resonators. The resonators will be further described with reference to FIGS. 10A to 13.

FIGS. 10A to 13 illustrate examples of a unit cell of a filter of a sign apparatus.

Figure 10A:
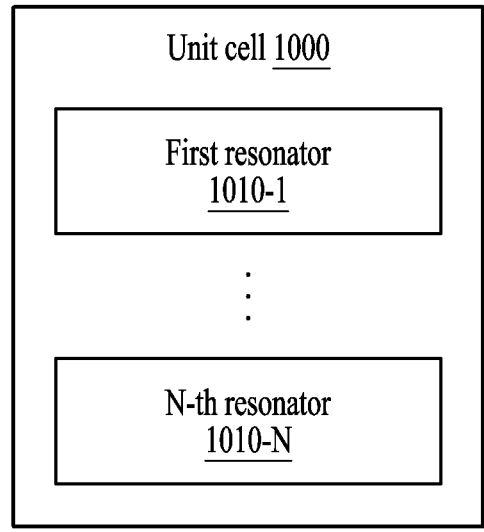
FIGS. 10A to 13 illustrate examples of a unit cell of a filter of a sign apparatus.
Figure 10B:
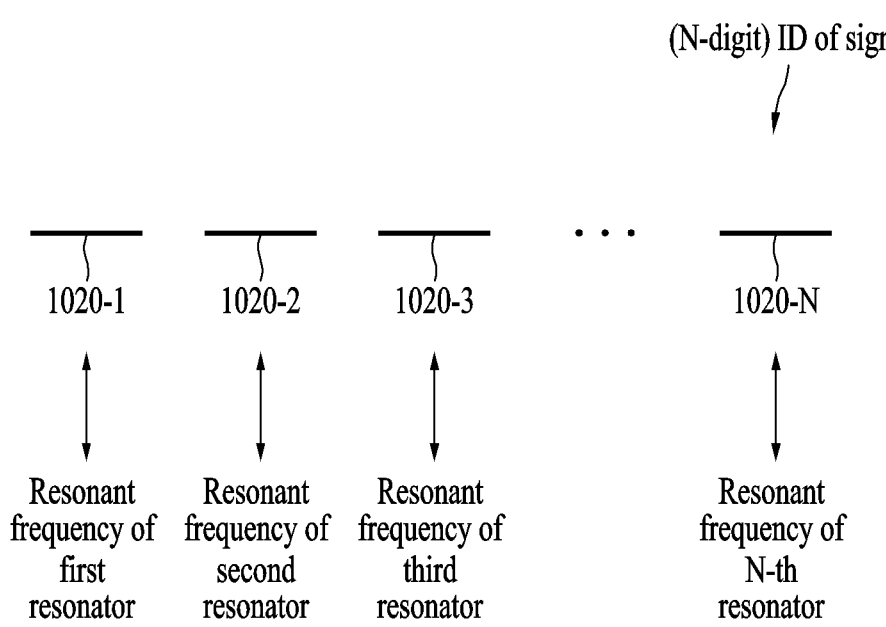

Referring to FIG. 10A, a unit cell 1000 of the filter 900 may include a plurality of resonators 1010-1 to 1010-N. According to identification information of a sign, the unit cell 1000 may include one resonator or may include a plurality of resonators having different resonant frequencies.

The identification information of the sign may have N digits. As in the example shown in FIG. 10B, the digits of the sign may correspond to the resonant frequencies of the resonators 1010-1 to 1010-N. A first digit 1020-1 of the identification information of the sign may correspond to the resonant frequency of the first resonator 1010-1. A second digit 1020-2 of the identification information of the sign may correspond to the resonant frequency of the second resonator 1010-2. A third digit 1020-3 of the identification information of the sign may correspond to the resonant frequency of the third resonator 1010-3. A last digit (or an N-th digit) 1020-N of the identification information of the sign may correspond to the resonant frequency of the N-th resonator 1010-N. The first digit to the last digit of the N digits of the identification information of the sign may correspond to different frequencies (e.g., different resonant frequencies), respectively.

The unit cell 1000 may include a resonator having, as a resonant frequency, a frequency corresponding to a digit having a first value (e.g., "0") of the identification information of the sign.

For example, the sign may have five-digit identification information "00000". Each digit of the identification information of the sign may have "0". In this case, the unit cell 1000 may include resonators having, as resonant frequencies, frequencies corresponding to the five digits.

Figure 11:
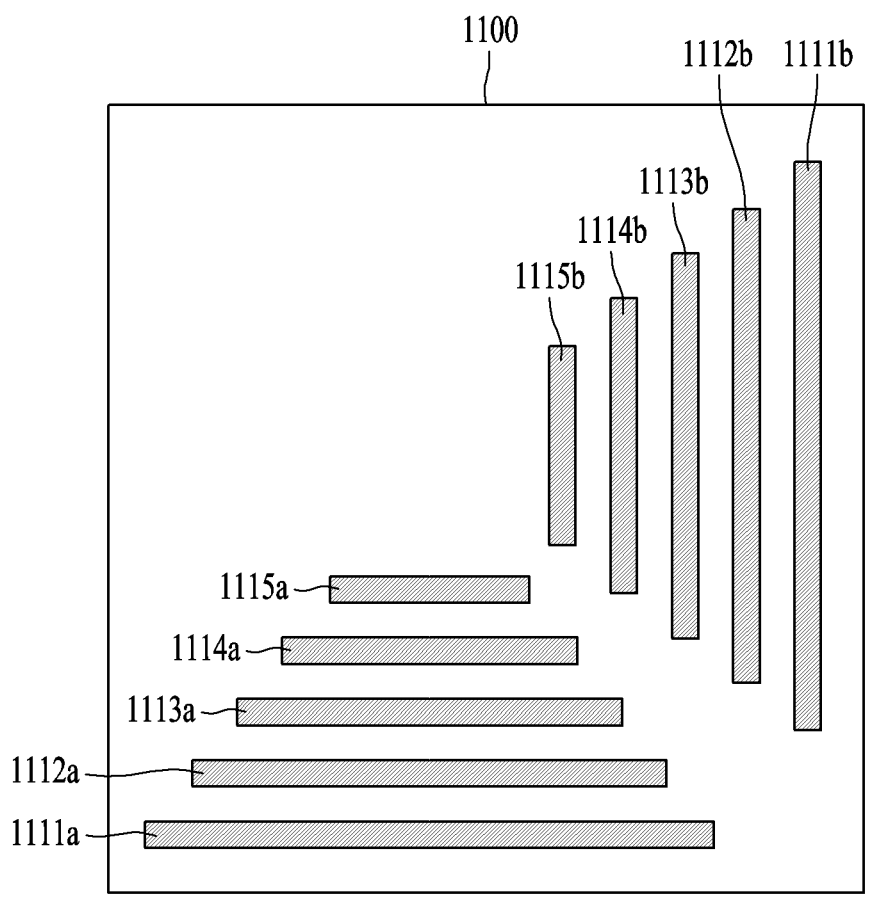

An example of the unit cell 1000 when the identification information of the sign has five binary digits is shown in FIG. 11.

In the example shown in FIG. 11, a unit cell 1100 may include first resonators 1111a and 1111b having, as the resonant frequency, a frequency f1 corresponding to the first digit, second resonators 1112a and 1112b having, as the resonant frequency, a frequency f2 corresponding to the second digit, third resonators 1113a and 1113b having, as the resonant frequency, a frequency f3 corresponding to the third digit, fourth resonators 1114a and 1114b having, as the resonant frequency, a frequency f4 corresponding to the fourth digit, and fifth resonators 1115a and 1115b having, as the resonant frequency, a frequency f5 corresponding to the fifth digit. Here. f1<f2<f3<f4<f5 may be satisfied.

In the example shown in FIG. 11, each resonator may have a pole shape. The first resonators 1111a and 1111b, the second resonators 1112a and 1112b, the third resonators 1113a and 1113b, the fourth resonators 1114a and 1114b, and the fifth resonators 1111a and 1111b may differ in size. In some examples, the resonators may be positioned on the same layer. In other examples, the resonators may be positioned on different layers.

In the example shown in FIG. 11, the number of resonators in the unit cell 1100 (e.g., "10") may be twice the number of digits in the identification information.

Figure 12:
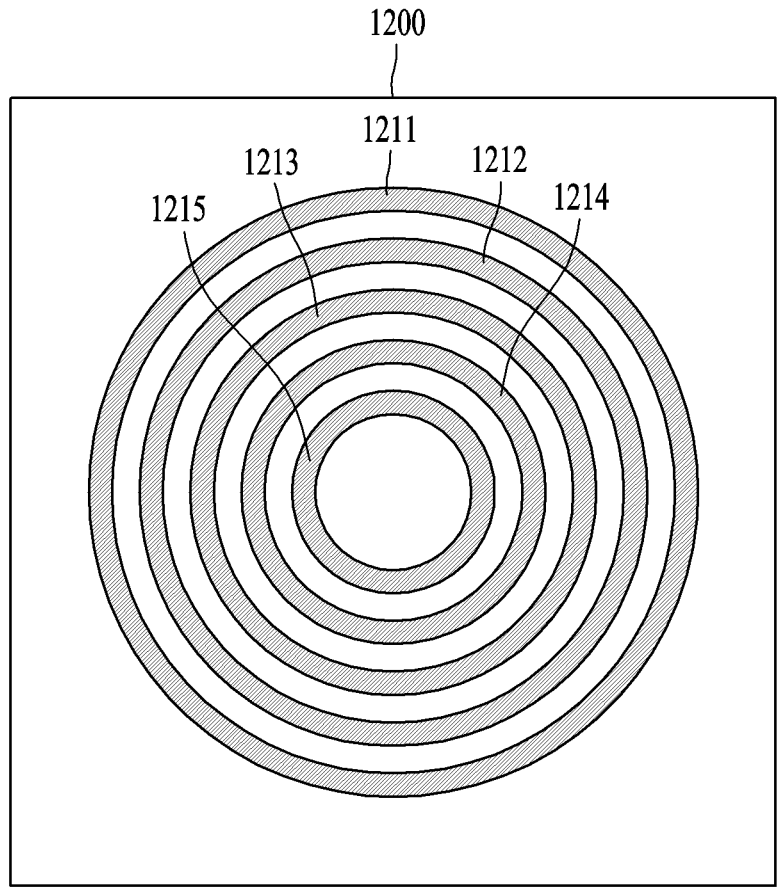

Another example of the unit cell 1000 when the identification information of the sign is five binary digits is shown in FIG. 12.

In the example shown in FIG. 12, a unit cell 1200 may include a first resonator 1211 having, as the resonant frequency, a frequency f1 corresponding to the first digit, a second resonator 1212 having, as the resonant frequency, a frequency f2 corresponding to the second digit, a third resonator 1213 having, as the resonant frequency, a frequency f3 corresponding to the third digit, a fourth resonator 1214 having, as the resonant frequency, a frequency f4 corresponding to the fourth digit, and a fifth resonator 1215 having, as the resonant frequency, a frequency f5 corresponding to the fifth digit.

In the example shown in FIG. 12, each resonator may have a circular shape. The first resonator 1211, the second resonator 1212, the third resonator 1213, the fourth resonator 1214, and the fifth resonator 1215 may differ in size. In some examples, the resonators may be positioned on the same layer. In other examples, the resonators may be positioned on different layers.

In the example shown in FIG. 12, the number of resonators in the unit cell 1200 (e.g., "5") may be equal to the number of zeros in the identification information.

Figure 13:
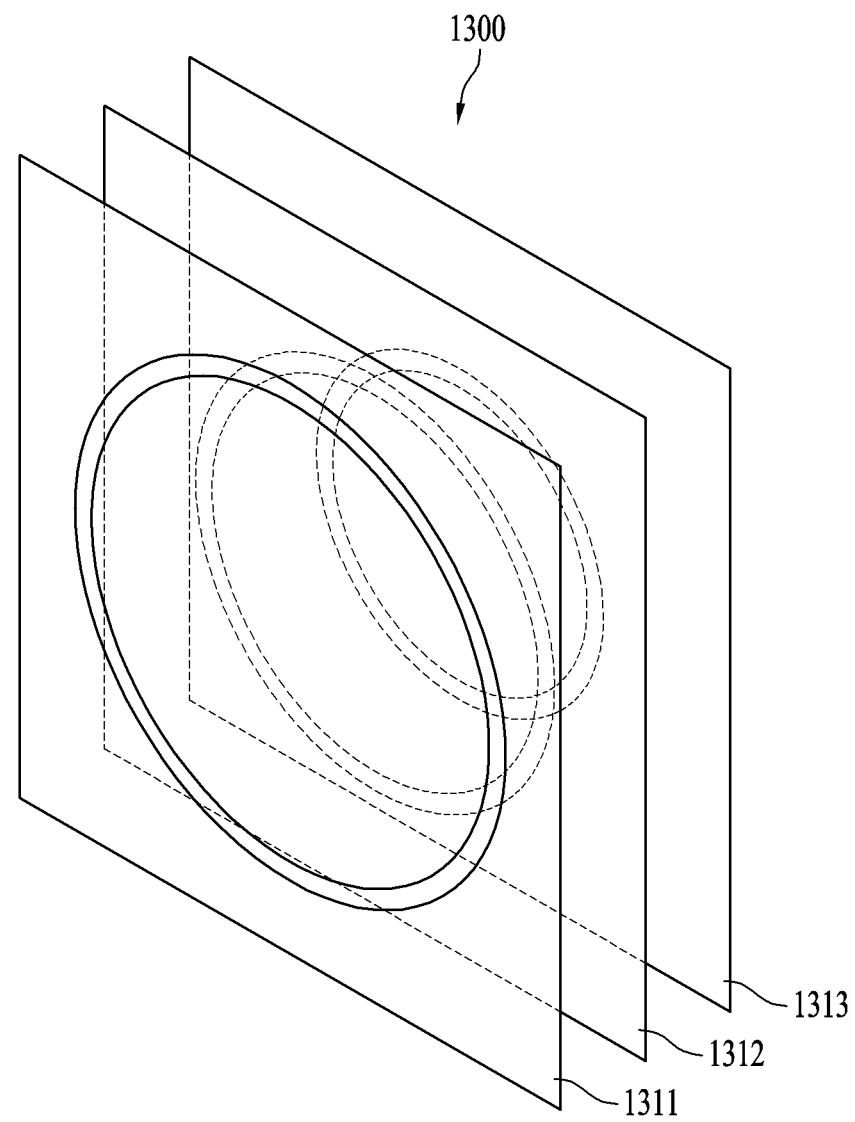

Still another example of the unit cell 1000 when the identification information of the sign is five digits is shown in FIG. 13.

In the example shown in FIG. 13, a unit cell 1300 may include a first resonator 1311 having, as the resonant frequency, a frequency f1 corresponding to the first digit, a second resonator 1312 having, as the resonant frequency, a frequency f2 corresponding to the second digit, a third resonator 1313 having, as the resonant frequency, a frequency f3 corresponding to the third digit, a fourth resonator (not shown) having, as the resonant frequency, a frequency f4 corresponding to the fourth digit, and a fifth resonator (not shown) having, as the resonant frequency, a frequency f5 corresponding to the fifth digit.

In the example shown in FIG. 13, each resonator may have a circular shape. Each resonator may be positioned on a different layer. In FIG. 13, the diameter of the fourth resonator may be less than the diameter of the third resonator 1313, and the diameter of the fifth resonator may be less than the diameter of the fourth resonator.

In the example shown in FIG. 13, the number of resonators in the unit cell 1300 (e.g., "5") may be equal to the number of zeros in the identification information.

In the examples shown in FIGS. 11 to 13, when the radar signal passing through the display 710 is incident to the filter 900, the first to fifth resonators may resonate. In other words, the radar signal may be an electromagnetic wave, and any combination of the first to fifth resonators may resonate. Through this resonance, the filter 900 may reject (or attenuate, negate, etc.) signals having the resonant frequencies of the first to fifth resonators in the radar signal passing through the display 710. Such negation may be through destructive interference. The filter 900 may reject/reduce energy of a signal portion having a frequency (e.g., f1, f2, f3, f4, or f5) corresponding to a digit having a first value (e.g., "0") of identification information (e.g., 01001) of a sign.

As another example, the sign may have 5-digit identification information "10101", where the second digit and the fourth digit are "0". In this case, the unit cell 1100 of FIG. 11 may include (or activate) the second resonators 1112a and 1112b and the fourth resonators 1114a and 1114b, and may not include (or activate) the first resonators 1111a and 1111b, the third resonators 1113a and 1113b, and the fifth resonators 1115a and 1115b. The unit cell 1200 of FIG. 12 may include (or activate) the second resonator 1212 and the fourth resonator 1214, and may not include (or activate) the first resonator 1211, the third resonator 1213, and the fifth resonator 1215. The unit cell 1300 of FIG. 13 may include (or activate) the second resonator 1312 and the fourth resonator, and may not include (or activate) the first resonator 1311, the third resonator 1313, and the fifth resonator.

Each unit cell of the filter of the sign apparatus 620 described with reference to FIG. 6A may include (or activate) the second resonators 1112a and 1112b and the fourth resonators 1114a and 1114b of FIG. 11, or may include (or activate) the second resonator 1212 and the fourth resonator 1214 of FIG. 12, or may include (or activate) the second resonator 1312 and the fourth resonator of FIG. 13.

The filter 900 may reject a signal portion having the resonant frequency of the second resonator and a signal having the resonant frequency of the fourth resonator in the radar signal passing through the display 710. The filter 900 may reject a signal of a frequency (e.g., f2 or f4) corresponding to a digit having a first value (e.g., "0") of the identification information (e.g., 10101) of the sign, and allow a signal of a frequency (e.g., f1, f3, or f5) corresponding to a digit having a second value (e.g., "1") to pass.

As still another example, the sign may have 5-digit identification information "01001". The first digit, the third digit, and the fourth digit of the identification information of the sign may have "0". In this case, the unit cell 1100 of FIG. 11 may include (or activate) the first resonators 1111*a* and 1111*b*, the third resonators 1113*a* and 1113*b*, and the fourth resonators 1114*a* and 1114*b*, and may not include (or activate) the second resonators 1112*a* and 1112*b* and the fifth resonators 1115*a* and 1115*b*. The unit cell 1200 of FIG. 12 may include (or activate) the first resonator 1211, the third resonator 1213, and the fourth resonator 1214, and may not include (or activate) the second resonator 1212 and the fifth resonator 1215. The unit cell 1300 of FIG. 13 may include (or activate) the first resonator 1311, the third resonator 1313, and the fourth resonator, and may not include (or activate) the second resonator 1312 and the fifth resonator.

Each unit cell of the filter of the sign apparatus 630 described with reference to FIG. 6B may include (or activate) the first resonators 1111*a* and 1111*b*, the third resonators 1113*a* and 1113*b*, and the fourth resonators 1114*a* and 1114*b* of FIG. 11, or may include (or activate) the first resonator 1211, the third resonator 1213, and the fourth resonator 1214 of FIG. 12, or may include (or activate) the first resonator 1311, the third resonator 1313, and the fourth resonator of FIG. 13.

The filter 900 may reject a signal having the resonant frequency of the first resonator, a signal having the resonant frequency of the third resonator, and a signal having the resonant frequency of the fourth resonator in the radar signal passing through the display 710. The filter 900 may reject a signal of a frequency (e.g., f1, f3, or f4) corresponding to a digit having a first value (e.g., "0") of the identification information (e.g., 01001) of the sign, and allow a signal of a frequency (e.g., f2 or f5) corresponding to a digit having a second value (e.g., "1") to pass.

Figure 14:
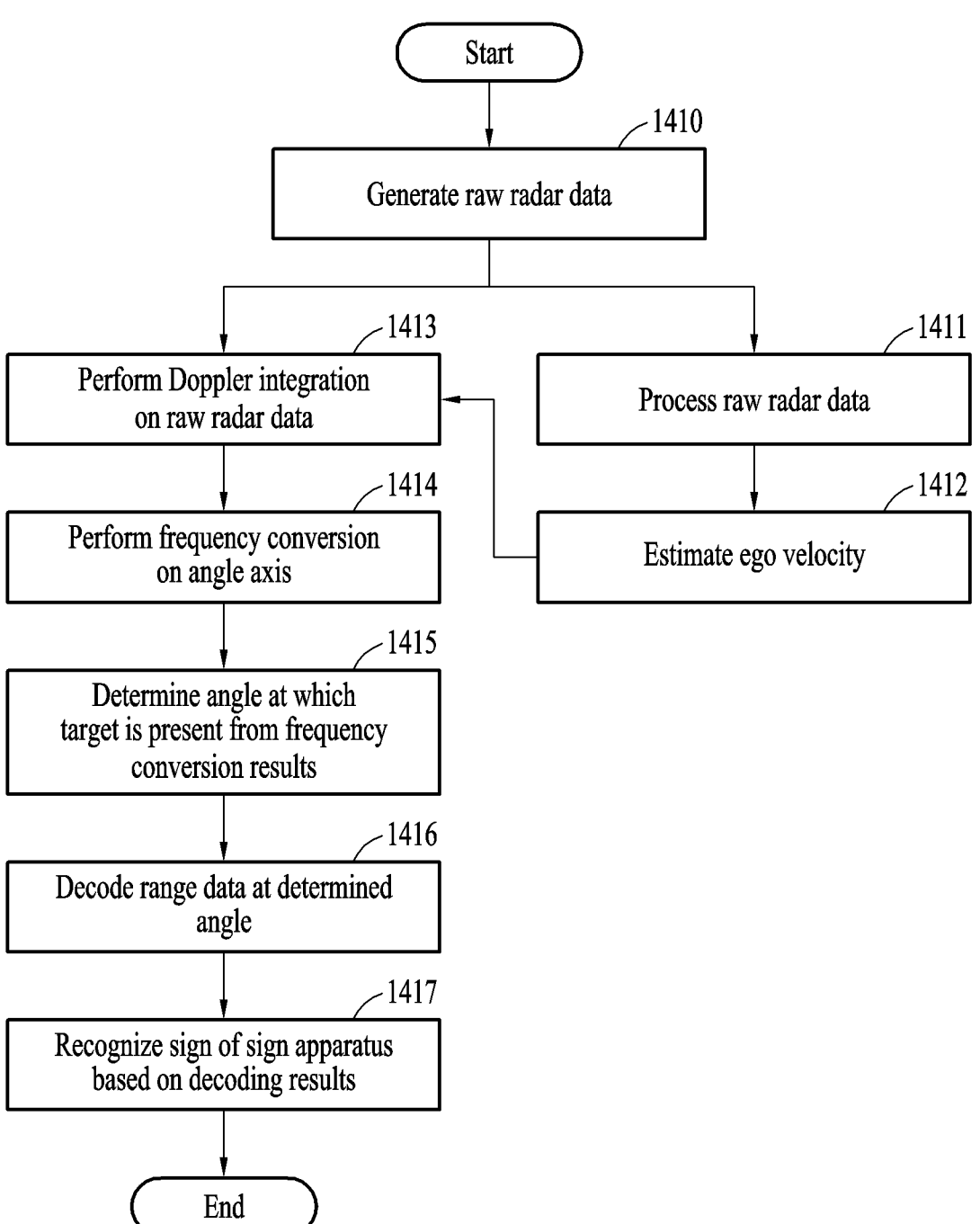
FIGS. 14 to 16 illustrate an example of an operation of a radar signal processing apparatus.
Figure 15:
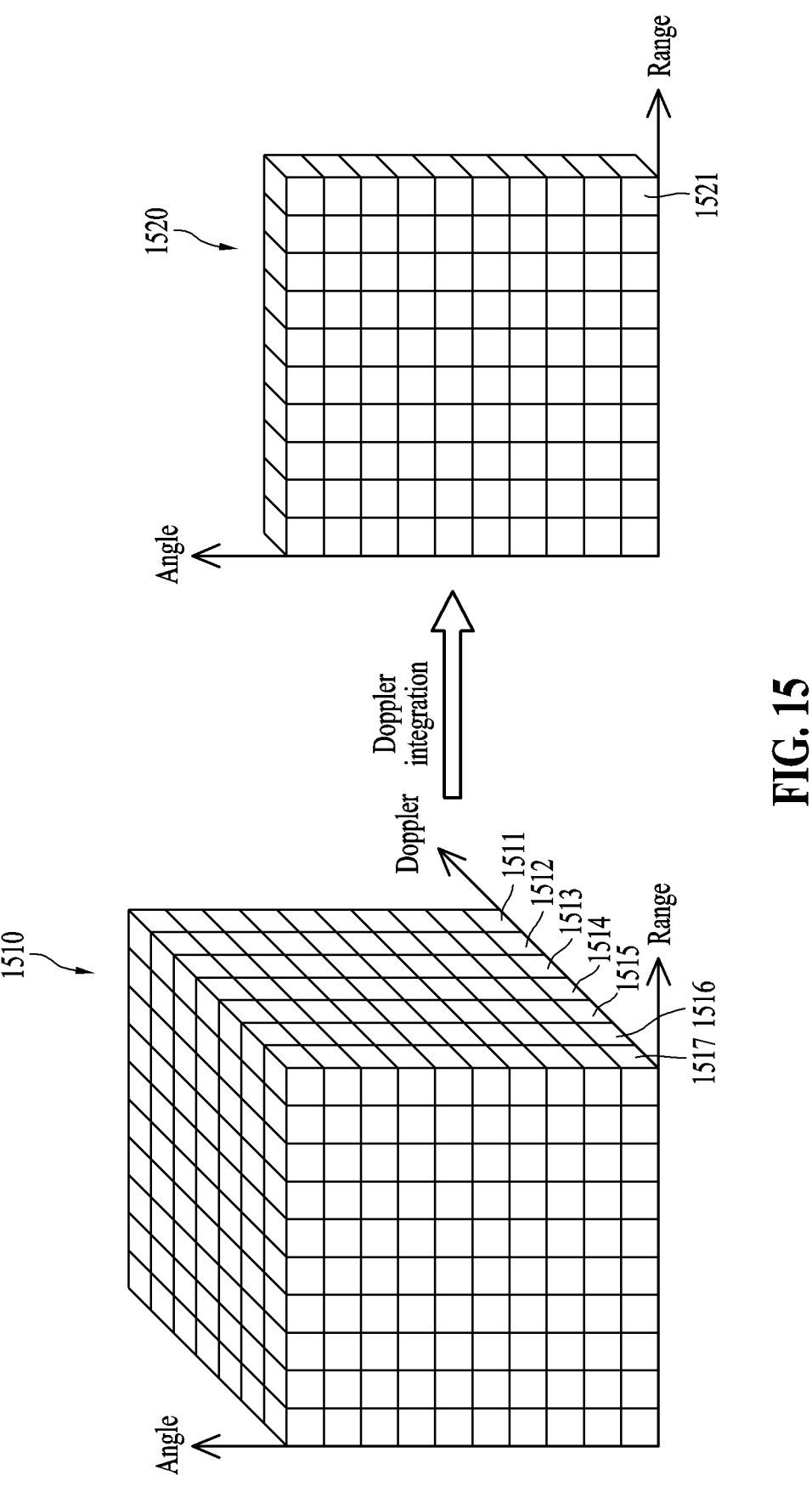
Figure 16:
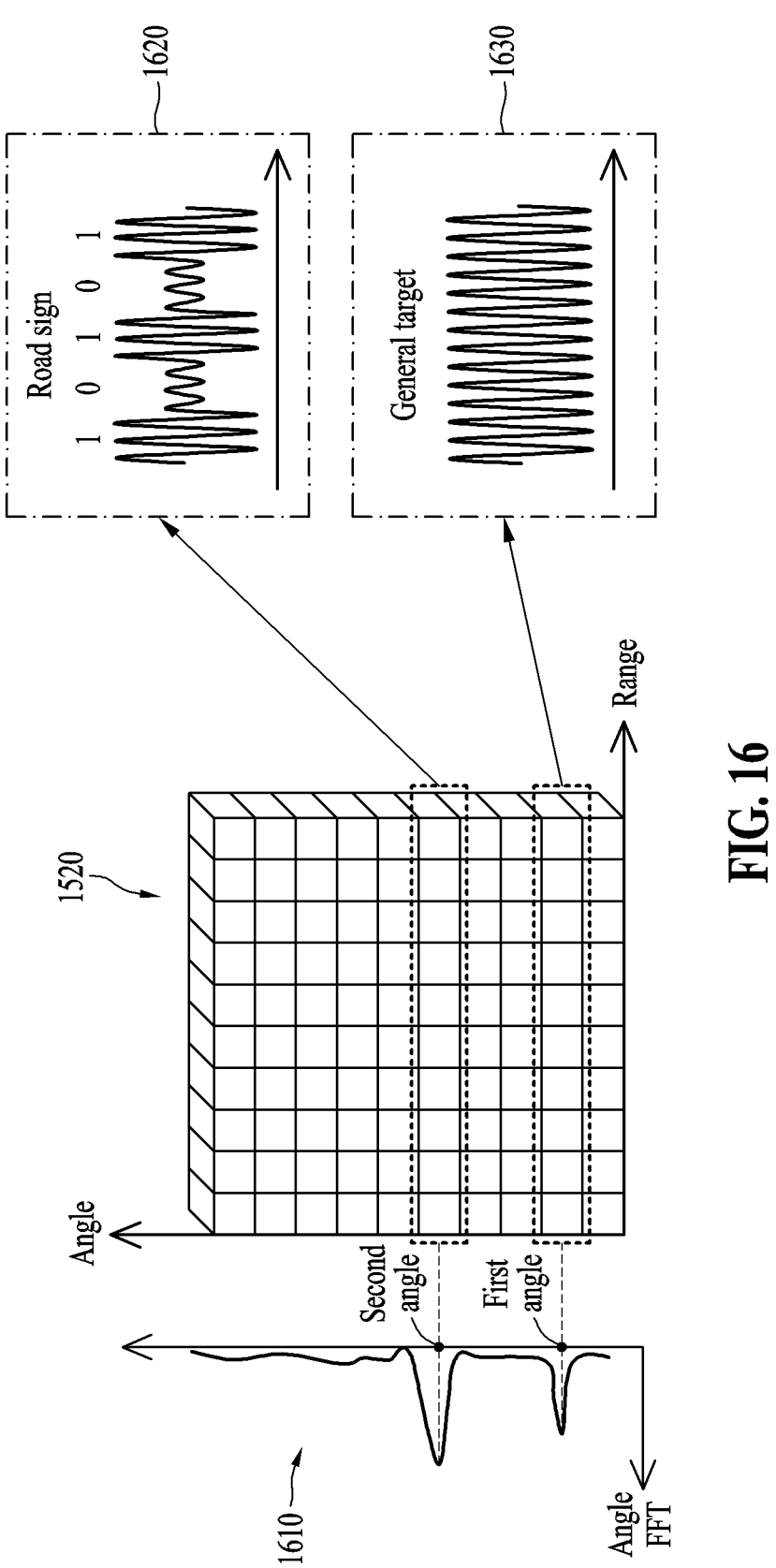

FIGS. 14 to 16 illustrate an example of an operation of a radar signal processing apparatus. The operations of FIG. 14 may be performed in the sequence and manner as shown. However, the order of some operations may be changed, or some of the operations may be omitted, without departing from the spirit and scope of the shown example. Additionally, operations illustrated in FIG. 14 may be performed in parallel or simultaneously. One or more blocks of FIG. 14, and combinations of the blocks, can be implemented by special purpose hardware-based computer that perform the specified functions, or combinations of special purpose hardware and instructions, e.g., computer or processor instructions. For example, operations 1410 through 1417 may be performed by a computing apparatus (e.g., processor 220 or the system 200 of FIG. 2). In addition to the description of FIG. 4 below, the descriptions of FIGS. 1-13 are also applicable to FIG. 14.

Referring to FIG. 14, in operation 1410, the radar signal processing apparatus 200 may generate raw radar data (e.g., the raw radar data 540) based on a radar signal of the radar sensor 310 and a reflected signal. For example, the radar signal processing apparatus 200 may generate an IF signal based on the radar signal and the reflected signal, and generate the raw radar data through a sampling operation and frequency conversion (e.g., FFT) on the IF signal. An example of the raw radar data is shown in FIG. 15. In the example shown in FIG. 15, the radar signal processing apparatus 200 may generate raw radar data 1510 with a range axis, an angle axis, and a Doppler axis.

Referring to FIG. 14, in operation 1411, the radar signal processing apparatus 200 may process the raw radar data 1510. For example, the radar signal processing apparatus 200 may process the raw radar data 1510 according to the operation described above with reference to FIG. 5. Through this processing, the radar signal processing apparatus 200 may detect the velocity and the direction of a target.

In operation 1412, the radar signal processing apparatus 200 may estimate an ego velocity. The ego velocity may be the velocity of an ego vehicle (e.g., a vehicle equipped with the radar signal processing apparatus 200). For example, the radar signal processing apparatus 200 may estimate the ego velocity based on results of processing the raw radar data 1510. The radar signal processing apparatus 200 may determine a stationary target (e.g., the sign apparatus 700, etc.) and a moving target (e.g., a moving vehicle, etc.) using the estimated ego velocity.

In operation 1413, the radar signal processing apparatus 200 may perform Doppler integration on the raw radar data 1510. Doppler integration may refer to integrating data on a Doppler axis, for example. Since the vehicle equipped with the radar signal processing apparatus 200 is moving, the radar signal processing apparatus 200 may correct the data on the Doppler axis through the estimated ego velocity and integrate the corrected data. An example of radar data on which Doppler integration is performed is shown in FIG. 15. In the example shown in FIG. 15, the radar signal processing apparatus 200 may generate radar data 1520 by performing Doppler integration on the raw radar data 1510. The radar signal processing apparatus 200 may integrate data in the same position on the range axis, in the same position on the angle axis, and in different positions on the Doppler axis. For example, data 1521 may be derived by integrating data 1511 to 1517 on the Doppler axis of the raw radar data 1510. In this case, the radar signal processing apparatus 200 may correct the data 1511 to 1517 through the estimated ego velocity, and derive the data 1521 by integrating the corrected data. In the manner described above, the radar signal processing apparatus 200 may derive each piece of data on the radar data 1520 with respect to the range and the angle.

As the radar signal processing apparatus 200 performs Doppler integration, the radar data 1520 with an improved signal-to-noise ratio (SNR) may be obtained.

Referring to FIG. 14, in operation 1414, the radar signal processing apparatus 200 may perform frequency conversion (e.g., FFT) on the angle axis of the radar data on which Doppler integration is performed (e.g., the radar data 1520 of FIG. 15). In operation 1415, the radar signal processing apparatus 200 may determine an angle at which a target is present, from frequency conversion results. In operation 1416, the radar signal processing apparatus 200 may decode range data at the determined angle. In operation 1417, the radar signal processing apparatus 200 may recognize a sign of a sign apparatus based on decoding results. An example of operations 1414 to 1417 will be described with reference to FIG. 16.

In the example shown in FIG. 16, the radar signal processing apparatus 200 may perform FFT on the angle axis of the radar data 1520 on which Doppler integration is performed. In other words, the radar signal processing apparatus 200 may perform angle FFT on the radar data 1520.

The radar signal processing apparatus 200 may detect a first angle and a second angle at which the target (or a reflected signal) is present, through peak detection in FFT results 1610. The radar signal processing apparatus 200 may extract range data 1630 at the first angle and range data 1620 at the second angle.

The radar signal processing apparatus 200 may detect "10101", for example, by decoding the range data 1620 at the second angle. The radar signal processing apparatus 200 may recognize or identify the sign of the sign apparatus 700 based on the detected "10101". A vehicle may be controlled to drive according to the recognized sign. The range data 1630 at the first angle may exhibit a continuous waveform (i.e., does not have frequency "holes" due to sign filtering). Even if the radar signal processing apparatus 200 decodes the range data 1630 at the first angle, valid information (e.g., identification information of the sign) may not be obtained. The target present on the first angle may not encode its own identification information in a reflected signal, and thus, the range data 1630 at the first angle may exhibit a continuous waveform. A target that does not perform encoding may be referred to as a general target in FIG. 16.

In one example, the radar signal processing apparatus 200 detecting the angle at which the target (or the reflected signal) is present through angle axis FFT may reduce the time it takes to find an encoded signal and enhance the SNR of a signal of the angle. The SNR enhancement operation (e.g., Doppler integration and angle axis FFT) of the radar signal processing apparatus 200 may increase the range for recognizing (or identifying) a sign of a sign apparatus and improve the recognition accuracy.

According to the examples described above, it is possible to recognize (or identify) a road sign with radar. According to the examples described above, sign information may be encoded without adding an electrical device to an existing sign. According to the examples described above, a sign may be recognized through a decoding algorithm without changing the hardware of a radar sensor (or the configuration of a radar system in a vehicle). According to the examples described above, it is possible to improve sign recognition performance (e.g., recognition range and accuracy) may be improved.

The computing apparatuses, the electronic devices, the processors, the memories, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for displaying a sign comprising:
a display, comprising a transparent member, configured to display the sign and to permit a radar signal radiated from a source to pass;
a filter configured to attenuate a signal of at least one frequency in the radar signal passing through the display and to allow a signal of a remaining frequency to pass; and
a reflector configured to reflect the signal passing through the filter,
wherein the reflected signal comprises encoded identification information of the sign, and
wherein the display is located on the filter.

2. The apparatus of claim 1, wherein
the identification information has N digits;
a first digit to a last digit of the N digits correspond to different frequencies; and
the filter is further configured to attenuate a signal of a frequency corresponding to a digit having a first value and to allow a signal of a frequency corresponding to a digit having a second value to pass.

3. The apparatus of claim 2, wherein
the filter is further configured to attenuate a signal of a frequency corresponding to the first digit in response to the first digit having the first value, and to allow the signal of the frequency corresponding to the first digit in response to the first digit having the second value.

4. The apparatus of claim 2, wherein
the filter comprises unit cells, and
each of the unit cells comprises a resonator having a frequency corresponding to a digit having the first value as a resonance frequency.

5. The apparatus of claim 1, wherein
the filter comprises unit cells, and
each of the unit cells comprises a number of resonators corresponding to a number of first values in the identification information or equal to a multiple of the number of first values.

6. The apparatus of claim 5, wherein
each of the unit cells comprises resonators of different sizes, in response to the identification information having a plurality of first values.

7. The apparatus of claim 6, wherein
the resonators are positioned on different layers.

8. The apparatus of claim 5, wherein
a spacing between the unit cells corresponds to half a wavelength value of a center frequency of the radiated radar signal.

9. The apparatus of claim 1, wherein
the filter is spaced apart from the reflector by a first distance.

10. The apparatus of claim 9, wherein
the first distance is greater than a result of multiplying a wavelength value of a center frequency of the radiated radar signal with a value.

11. The apparatus of claim 1, wherein
the reflector comprises a trihedral corner reflector.

12. The apparatus of claim 1, wherein
the source comprises a radar sensor disposed in an autonomous vehicle.

13. An apparatus for displaying a sign, the apparatus comprising:
a display, comprising a transparent member, configured to display the sign and to permit a radar signal radiated from a source to pass;
a filter comprising resonators, the filter configured to attenuate a signal of a resonant frequency of each of the resonators in the radar signal passing through the display and to allow a signal of a remaining frequency to pass; and
a reflector configured to reflect the signal passing through the filter,
wherein the reflected signal comprises encoded identification information of the sign, and
wherein the display is located on the filter.

14. The apparatus of claim 13, wherein
the identification information has N digits,
a first digit to a last digit of the N digits correspond to different frequencies, and the resonant frequency is same as a frequency of a digit
   having a first value in the identification information.

15. The apparatus of claim 13, wherein the filter comprises unit cells, and each of the unit cells comprises one or more resonators of
   the resonators.

16. The apparatus of claim 15, wherein a spacing between the unit cells corresponds to half a
   wavelength value of a center frequency of the radiated
   radar signal.

17. The apparatus of claim 13, wherein the filter is spaced apart from the reflector by a first
   distance value.

18. The apparatus of claim 17, wherein the first distance value is greater than a result of multi-
   plying a wavelength value of a center frequency of the
   radiated radar signal with a value.

19. The apparatus of claim 13, wherein the reflector comprises a trihedral corner reflector.

20. The apparatus of claim 13, wherein the source comprises a radar sensor disposed in an
   autonomous vehicle.

\* \* \* \* \*